US011878823B2

(12) United States Patent
Morijiri et al.

(10) Patent No.: US 11,878,823 B2
(45) **Date of Patent: *Jan. 23, 2024**

(54) BINDING MACHINE

(71) Applicant: MAX CO., LTD., Tokyo (JP)

(72) Inventors: Takeshi Morijiri, Tokyo (JP); Nobutaka Tashima, Tokyo (JP); Shinpei Sugihara, Tokyo (JP); Satoshi Hotta, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,050

(22) Filed: Oct. 20, 2022

(65) Prior Publication Data

US 2023/0044936 A1 Feb. 9, 2023

Related U.S. Application Data

(63) Continuation of application No. 17/273,453, filed as application No. PCT/JP2019/035091 on Sep. 5, 2019, now Pat. No. 11,524,802.

(30) Foreign Application Priority Data

Sep. 7, 2018 (JP) ................................ 2018-168252
Aug. 28, 2019 (JP) ................................ 2019-156060

(51) Int. Cl.
*B65B 13/28* (2006.01)
*B25B 25/00* (2006.01)
(Continued)

(52) U.S. Cl.
CPC ............ *B65B 13/285* (2013.01); *B25B 25/00* (2013.01); *B65B 13/187* (2013.01); *E04G 21/12* (2013.01)

(58) Field of Classification Search
CPC ..... B65B 13/285; B65B 13/187; B25B 25/00; E04G 21/12
See application file for complete search history.

(56) References Cited

U.S. PATENT DOCUMENTS 5,044,568 A * 9/1991 Shigemizu ............ E04G 23/082 241/266
5,338,078 A * 8/1994 Basek .................... A01B 1/165 294/50.5
(Continued)

FOREIGN PATENT DOCUMENTS

CN 1066649 C 6/2001
CN 107517774 A 12/2017
(Continued)

OTHER PUBLICATIONS

Extended European Search Report for EP Application No. 19856941.0 dated Apr. 25, 2022 (7 pp.).
(Continued)

*Primary Examiner* — Lee A Holly
(74) *Attorney, Agent, or Firm* — Banner & Witcoff, Ltd.

(57) ABSTRACT

A rebar binding machine comprises a curl guide that causes a wire to curl, a torsion part including a torsion shaft for twisting the curled wire, and a pair of grips that can be grasped by an operator. The grips are provided to the two axial sides of the torsion shaft as viewed from the operator side when the operator grasps the grips to perform an operation, and it is possible to change the height of the grips in the axial direction of the torsion shaft.

8 Claims, 25 Drawing Sheets

(51) Int. Cl.

| | |
|---|---|
| ***B65B 13/08*** | (2006.01) |
| ***B65B 13/18*** | (2006.01) |
| ***E04G 21/12*** | (2006.01) |

(56) References Cited

U.S. PATENT DOCUMENTS

| | | | | |
|---|---|---|---|---|
| 5,944,064 | A * | 8/1999 | Saito | E04G 21/122 140/57 |
| 5,947,166 | A | 9/1999 | Doyle et al. | |
| 7,347,276 | B2 * | 3/2008 | Basek | A01B 1/14 16/444 |
| 8,528,472 | B2 | 9/2013 | Sacher | |
| 11,524,802 | B2 * | 12/2022 | Morijiri | B25B 25/00 |
| 2006/0157139 | A1 * | 7/2006 | Hoyaukin | E04G 21/123 140/119 |
| 2010/0224278 | A1 | 9/2010 | Kusakari et al. | |
| 2014/0013542 | A1 | 1/2014 | Wang | |
| 2017/0359973 | A1 | 12/2017 | Taguchi | |
| 2020/0113141 | A1 | 4/2020 | Taguchi | |

FOREIGN PATENT DOCUMENTS

| | | | |
|---|---|---|---|
| EP | 1468597 | A1 | 10/2004 |
| JP | S52-001924 | A | 1/1977 |
| JP | H07-290177 | A | 11/1995 |
| JP | 2006-520865 | A | 9/2006 |
| JP | 2010-112107 | A | 5/2010 |
| JP | 4760439 | B2 | 8/2011 |
| JP | 2017-189822 | A | 10/2017 |
| WO | 2017/082003 | A1 | 5/2017 |

OTHER PUBLICATIONS

International Search Report issued in Application No. PCT/JP2019/035091 dated Nov. 26, 2019, 5 pages.

* cited by examiner

BINDING MACHINE

CROSS-REFERENCE TO RELATED APPLICATIONS

This application is a continuation of U.S. application Ser. No. 17/273,453, filed on Mar. 4, 2021, which is a 35 U.S.C. 371 National Phase Entry Application from PCT/JP2019/035091, filed Sep. 5, 2019, which claims priority to Japanese Patent Application Nos. 2018-168252 filed on Sep. 7, 2018, and 2019-15606 filed on Aug. 28, 2019, the disclosures of which are incorporated herein their entirety by reference, and priority is claimed to each of the foregoing.

TECHNICAL FIELD

The present invention relates to a binding machine configured to bind a binding object such as a reinforcing bar and the like with a wire rod such as a wire.

BACKGROUND ART

In the related art, suggested is a reinforcing bar binding machine configured to wind a wire around reinforcing bars by a guide part and to twist the wire by a twisting unit, thereby binding the reinforcing bars (for example, refer to PTL 1).

In addition, suggested is a binding machine where a guide part configured to curl a wire around reinforcing bars and a twisting unit configured to twist the wire are arranged distant from a handle part (for example, refer to PTL 2).

PTL 1: JP 4760439 B

PTL 2: JP 2006-520865 A

SUMMARY OF INVENTION

For example, in a case where a grip position of the handle part is fixed, when binding reinforcing bars arranged on a floor surface, an operator needs to lean forward for operation, so that high burden is imposed on the waist and the like of the operator. In contrast, according to the binding machine disclosed in PTL 2, a handle is connected to another part of the machine via a telescopic part so as to change a change of the handle. An entire length of the machine, i.e., a length from the guide part to the handle is adjusted by changing a length of the telescopic part, according to a corresponding operation and a height of the operator.

However, when the telescopic part is configured so that the length thereof can be changed, like PTL 2, the internal wiring is complicated, and the electrical efficiency may be lowered as a length of an electric wire is extended.

As a method of adjusting the entire length of the binding machine, a method of replacing a part (hereinbelow, referred to as 'connecting part') configured to connect the handle part and a binding machine body part having the twisting unit and the like each other may be considered. In this case, however, it is necessary to detach the connecting part from the handle part and the binding machine body part, and to reassemble a connecting part having a different length with the handle part and the binding machine body part, which makes the replacement operation troublesome and may cause erroneous assembling. Further, in a case where the electric wiring is arranged inside or on an outer periphery of the connecting part, malfunctions such as disconnection may occur due to detachment and reconnection of the wiring.

In response to the above issue, it is an object of the present invention to provide a binding machine capable of changing an entire length of the binding machine, i.e., a length from a guide part from a grip position of a handle without extending a connecting part, according to a physique of an operator and using situations of the binding machine.

A binding machine according to one aspect of the present invention includes a first body part, a second body part including a curl guide and a twisting unit, the curl guide having an opening in which a binding object can be inserted and being configured to curl a wire around the binding object inserted in the opening, and the twisting unit including a twisting shaft for twisting the curled wire, and a connecting part connecting the first body part and the second body part each other. The first body part includes grips pairing up with each other and being able to be grasped by an operator. The grips are provided on respective both sides of an axis line of the twisting shaft, as seen from an operator-side when the operator performs an operation with grasping the grips, and positions of the grips can be changed in an axis line direction of the twisting shaft. Thereby, it is possible to adjust an entire length of the binding machine without extending the connecting part, according to a physique of the operator and using situations of the binding machine.

A binding machine according to another aspect of the present invention is a binding machine in which the grips are arranged such that axis lines of the grips are orthogonal or substantially orthogonal to the axis line of the twisting shaft.

According to the present invention, it is possible to adjust the entire length of the binding machine without changing a length of the connecting part by changing the grip position of the handle in the direction of the twisting shaft according to the physique of the operator and the using situations of the binding machine.

DESCRIPTION OF EMBODIMENTS

Hereinbelow, examples of the reinforcing bar binding machine as embodiments of the present invention will be described with reference to the drawings.

First Embodiment

Figure 1:
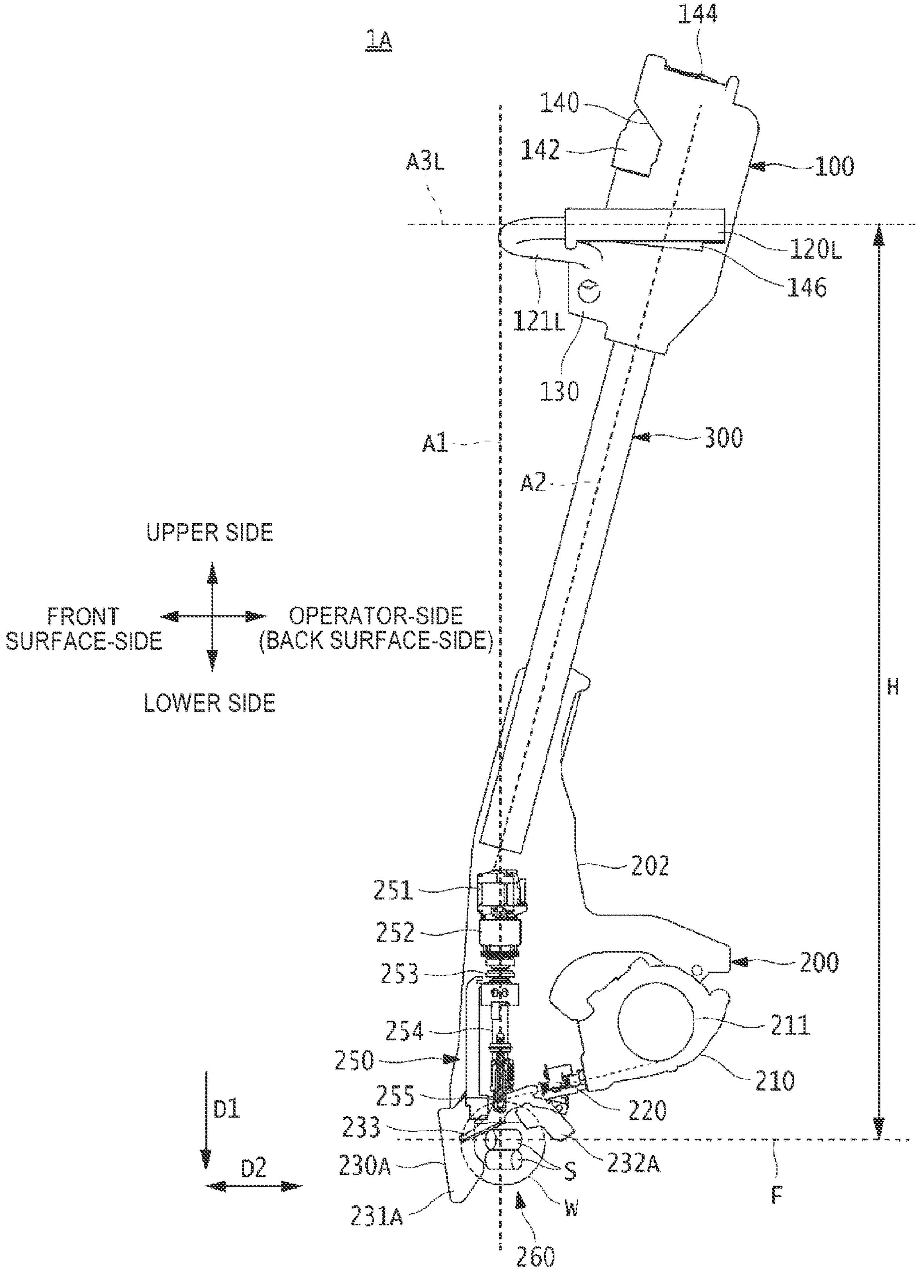
FIG. 1 is a side view depicting an internal configuration of a reinforcing bar binding machine of a first embodiment.
Figure 2:
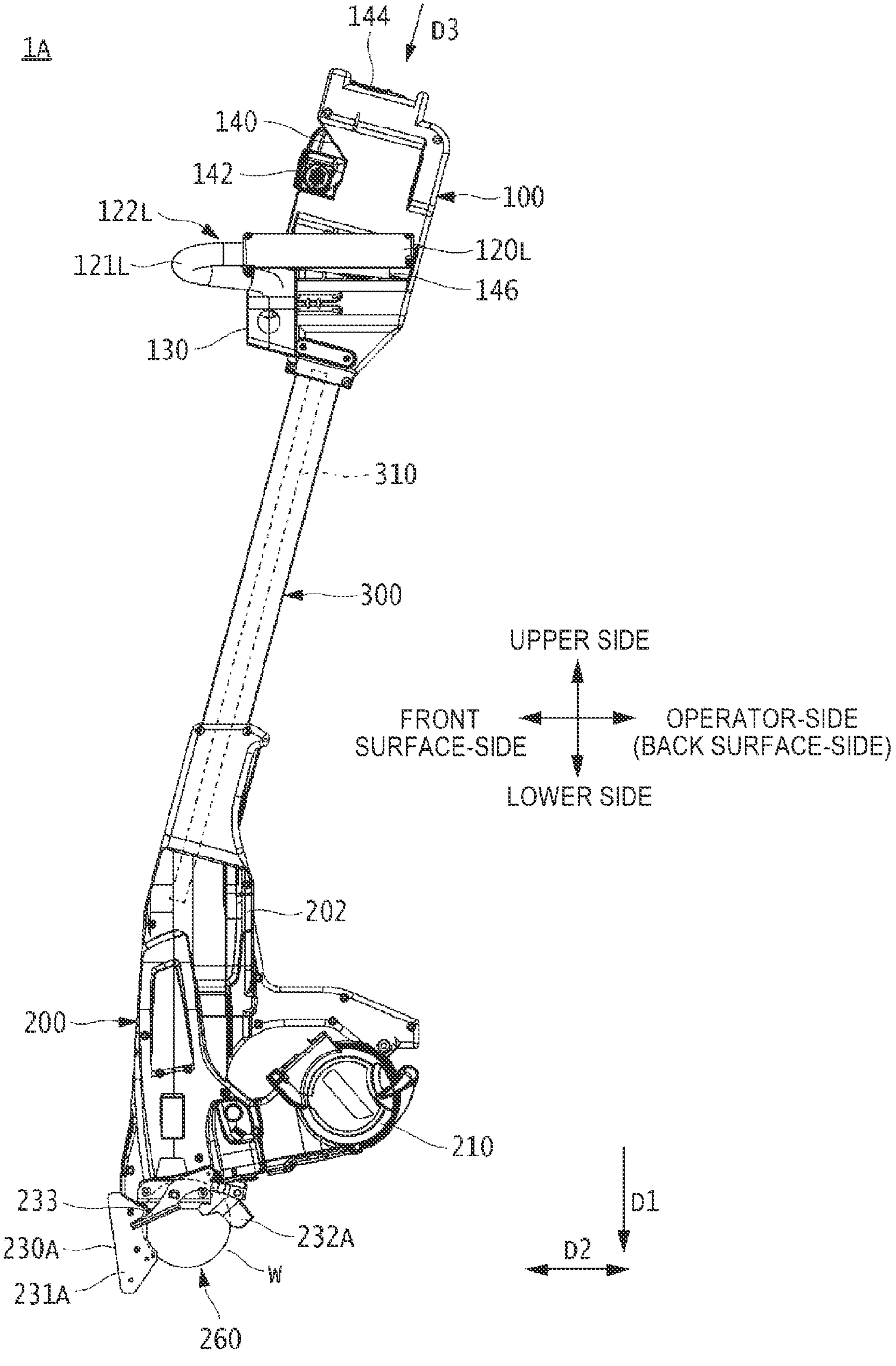
FIG. 2 is a side view depicting an external configuration of the reinforcing bar binding machine of the first embodiment.
Figure 3:
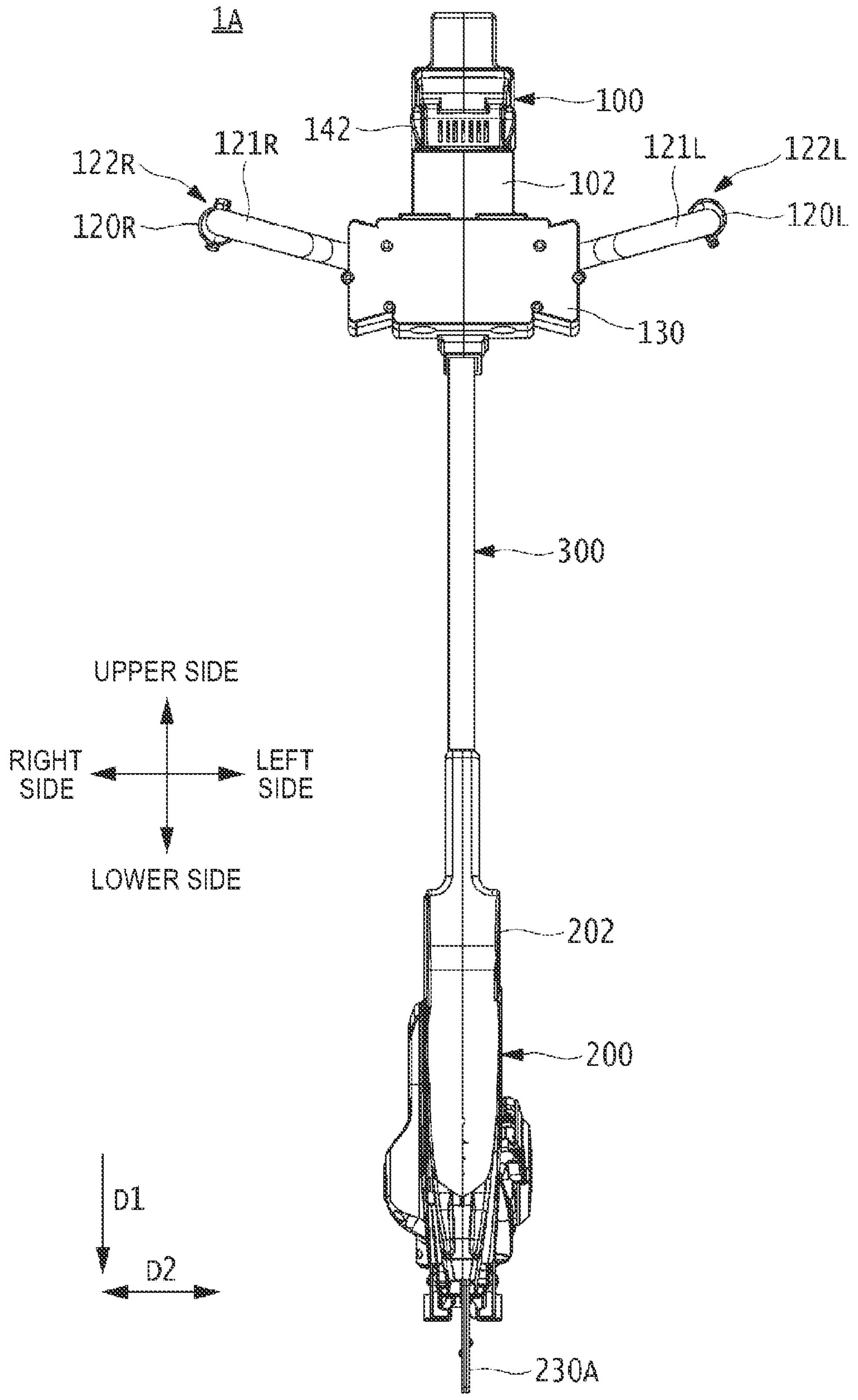
FIG. 3 is a front view depicting the external configuration of the reinforcing bar binding machine of the first embodiment.
Figure 4:
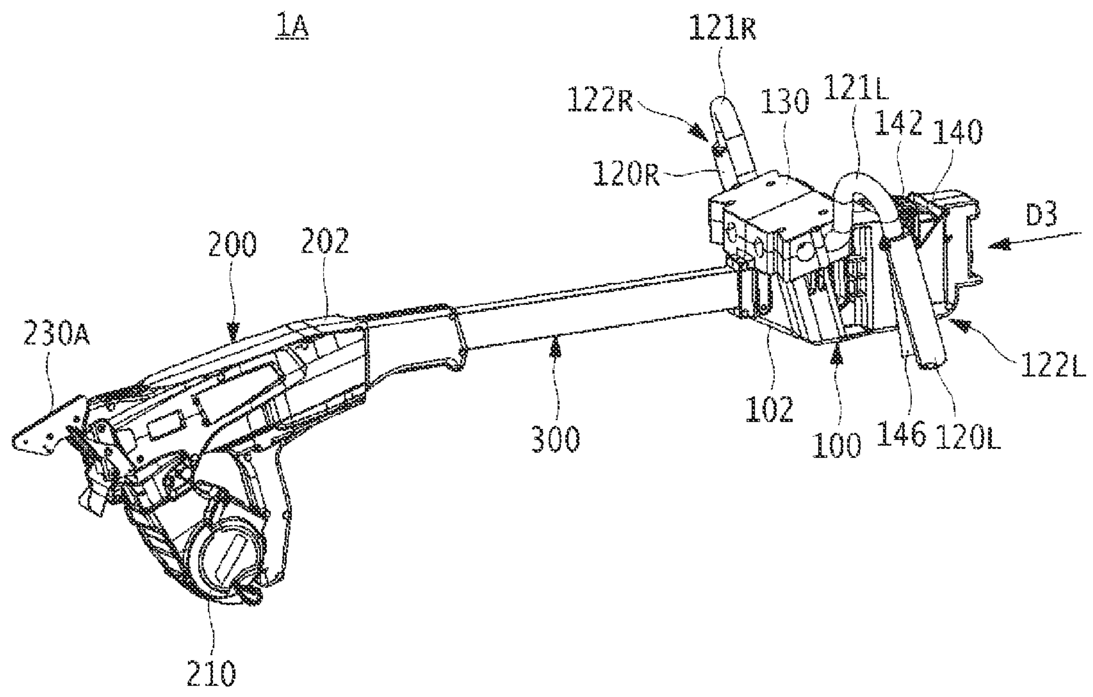
FIG. 4 is a perspective view depicting the external configuration of the reinforcing bar binding machine of the first embodiment.
Figure 5:
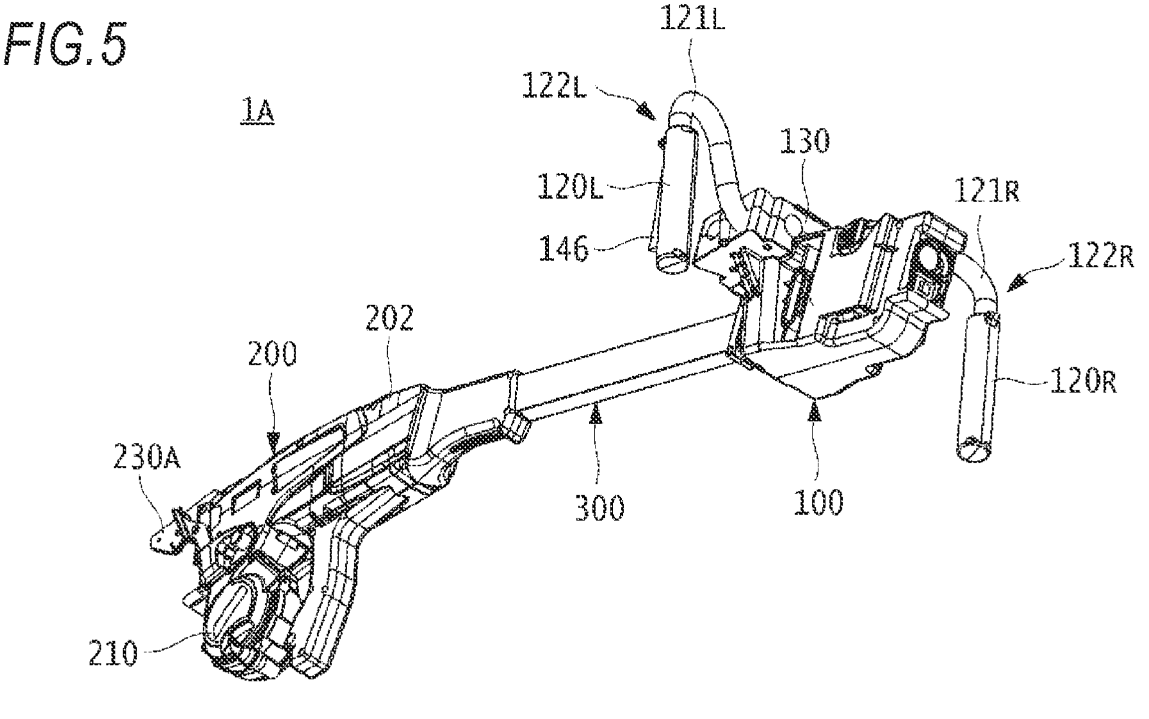
FIG. 5 is a perspective view depicting the external configuration of the reinforcing bar binding machine of the first embodiment.

FIG. 1 is a side view depicting an internal configuration of a reinforcing bar binding machine 1A of a first embodiment, FIG. 2 is a side view depicting an external configuration of the reinforcing bar binding machine 1A, FIG. 3 is a front view depicting the external configuration of the reinforcing bar binding machine 1A, and FIGS. 4 and 5 are perspective views.

Figure 6A:
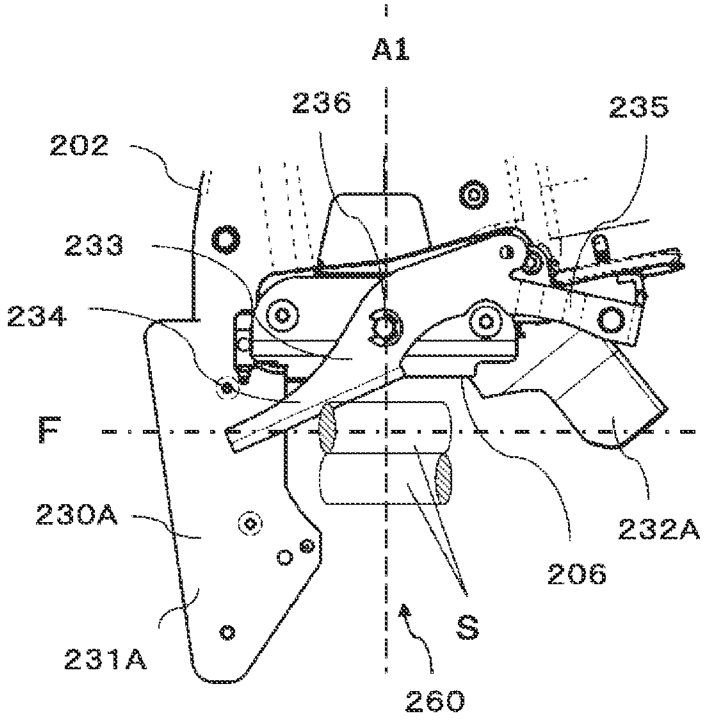
FIG. 6A and FIG. 6B are side views depicting a configuration of main parts of a second body part of the first embodiment.
Figure 6B:
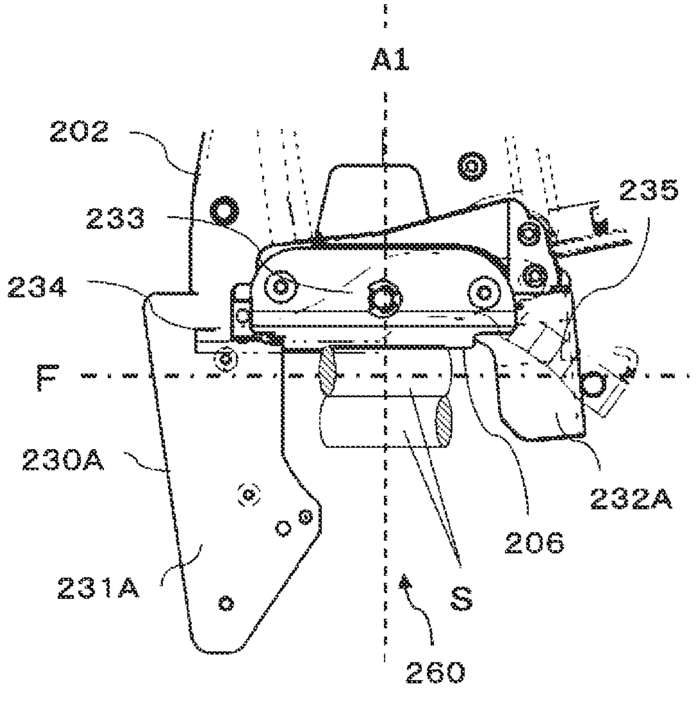
Figure 7A:
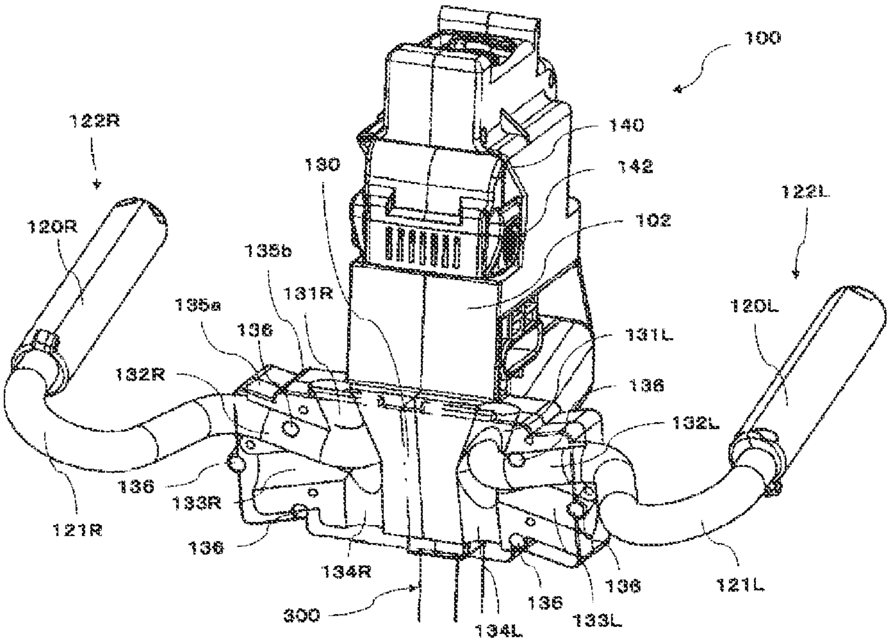
FIG. 7A and FIG. 7B are perspective views depicting a configuration of main parts of a first body part of the first embodiment.
Figure 7B:
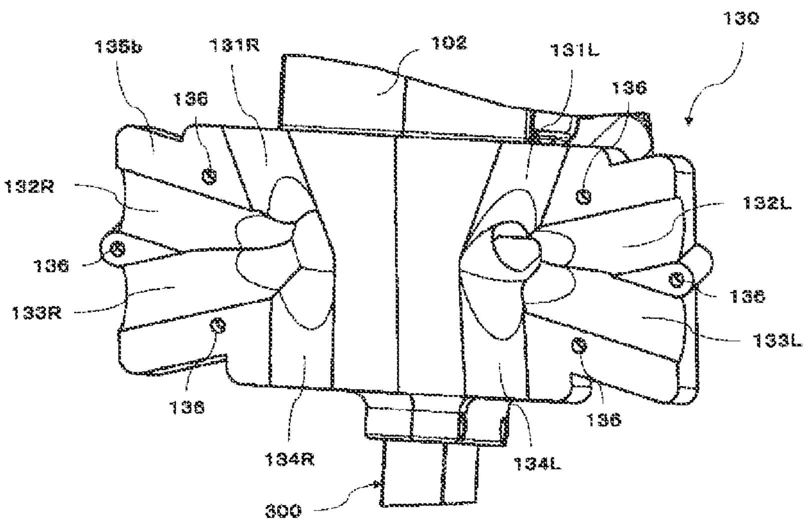

FIGS. 6A and 6B are side views depicting a configuration of main parts of a second body part of the reinforcing bar binding machine 1A of the first embodiment, FIGS. 7A and 7B are perspective views depicting a configuration of main parts of a first body part, and FIGS. 8A to 8C and 9A to 9C are front views depicting an example of a configuration where a grip height of the reinforcing bar binding machine 1A of the first embodiment is variable.

Hereinbelow, the reference signs indicating parts positioned on a left hand-side of an operator when an operator operates a reinforcing bar binding machine are attached with "L" and the reference signs indicating parts positioned on a right hand-side are attached with "R". A handle part 122L is a handle part on the left hand-side of the operator, and a handle part 122R is a handle part on the right hand-side of the operator.

[Configuration Example of Reinforcing Bar Binding Machine 1A]

A reinforcing bar binding machine 1A includes a first body part 100 having a pair of grips 120L and 120R that can be grasped by an operator, a second body part 200 including a curl guide 230A having an opening in which a binding object can be inserted and configured to curl a wire W around the binding object inserted in the opening, and a twisting unit 250 configured to twist the wire W curled by the curl guide 230A, and a connecting part 300 configured to connect the first body part 100 and the second body part 200 each other.

In the first embodiment, an axis line of a twisting shaft 253 configured to rotate by rotation of a twisting motor 251 arranged in the twisting unit 250 of the second body part 200 is denoted as A1. An axis line of the connecting part 300 is denoted as A2. An axis of the grip 120L that is grasped with the left hand by the operator and an axis of the grip 120R that is grasped with the right hand by the operator are each denoted as a grip axis A3L and a grip axis A3R.

In the present embodiment, a side on which the curl guide 230 is referred to as a tip end-side or a lower side of the reinforcing bar binding machine 1A, and an opposite side, i.e., an end portion-side of the first body part 100 is referred to as a base end-side or an upper side of the reinforcing bar binding machine 1A. When a tip end of the curl guide 230 is faced toward the direction of gravity, the reinforcing bar binding machine 1A has such a configuration that the second body part 200, the connecting part 300 and the first body part 100 are aligned in order from the lower side toward the upper side.

When operating the reinforcing bar binding machine 1A, aside on which the operator who grasps the grip 120L and the grip 120R stands is referred to as a rear surface-side of the reinforcing bar binding machine 1A and an opposite side is referred to as a front surface-side of the reinforcing bar binding machine 1A. Sides on which the grip 120L and the grip 120R are positioned are referred to as sides of the reinforcing bar binding machine 1A, and the grip 120R-side is referred to as a right side of the reinforcing bar binding machine 1A and the grip 120L-side is referred to as a left side of the reinforcing bar binding machine 1A.

The first body part 100 has handle parts 122L and 122R having a pair of grips 120L and 120R, a grip attaching part 130 having a plurality of groove portions to which the handle parts 122L and 122R can be attached, a first housing 102 configured to support an upper end-side of the elongated connecting part 300, and a battery mounting part 140 to which a battery 142, which is a power supply, is detachably mounted. A tip end-side of the first housing 102 is connected to the connecting part 300, and a base end-side thereof is provided with a setting unit 144 for setting a variety of operation conditions of the reinforcing bar binding machine 1A.

As shown in FIGS. 4 and 5, the handle parts 122L and 122R are constituted by U-shaped or M-shaped long members, as seen in an axis line direction D3 of the connecting part 300. At least one of the grips 120L and 120R is provided with an operation switch 146 (refer to FIG. 1) for starting a binding operation.

The handle part 122L has the grip 120L and a grip connecting portion 121L, and the handle part 122R has the grip 120R and a grip connecting portion 121R. The grips 120L and 120R are each attached to the grip attaching part 130 via the grip connecting portions 121L and 121R (refer to FIG. 7A). Note that, the handle part 122L and 122R may have diverse shapes, such as a linear shape as seen in the axis line direction D3 of the connecting part 300 or a U-shape or M-shape as seen in the front surface or back surface direction.

The grips 120L and 120R are provided on both sides of the axis line A1 of the twisting shaft 253, as seen from the operator-side when the operator performs an operation with grasping the grips 120L and 120R, and positions of the grips 120L and 120R can be changed in the direction of the axis line A1 of the twisting shaft 253.

In order to improve operability when the operator grasps the grips 120L and 120R, as shown in FIG. 1, the grip axes A3L and A3R (not shown) are preferably orthogonal or substantially orthogonal to the axis line A1 of the twisting shaft 253. However, the present invention is not limited thereto. For example, the grip axes A3L and A3R may have an upward or downward angle equal to or larger than a substantially orthogonal angle to the axis line A1 of the twisting shaft 253, for example, an angle of 5 degrees or larger.

In addition, angles of the grip axes A3L and A3R relative to the direction of gravity can also be adjusted as appropriate by changing connecting angles of the grips 120L and 120R and the grip connecting portions 121L and 1211R.

The grip attaching part 130 has a substantially cuboid shape and is attached to a front surface-side of the first housing 102. Upper, lower, left and right sides of the grip attaching part 130 are each provided with an attachment mechanism for attaching the handle parts 122L and 122R having the pair of grips 120L and 120R. Examples of the attachment mechanism may include a configuration where the grip attaching part 130 is constituted by a pair of attaching members, facing surfaces of the attaching members are formed with a plurality of groove portions into which the grips 120R and 120L are fitted, the grip connecting portions 121R and 121L are fitted into the groove portions and sandwiched between the pair of attaching members to fix the grips 120R and 120L to the grip attaching part 130. The other well-known attachment mechanisms can also be adopted.

Note that, a configuration where the first body part 100 is not provided with the grip attaching part 130 and the handle parts 122L and 122R having the pair of grips 120L and 120R are attached to the first housing 102 is also possible. In this case, the first housing 102 preferably has an attachment mechanism including a plurality of groove portions.

The battery mounting part 140 is provided to the first housing 102 so as to be positioned above the handle parts 122L and 122R. The battery mounting part 140 is arranged on an extension line of the axis line A2 of the connecting part 300.

The setting unit 144 is a unit for adjusting the number of turns of the wire W, the twisting torque for the wire W, and the like, and is constituted by a dial-type or push button-type switch, for example (refer to FIGS. 1 and 2).

Subsequently, a setting example of a grip height H is described. In the example of FIG. 1, a height from a reinforcing bar arrangement surface F set as a lower reference position of the grip height H to the grip axis A3L set as an upper reference position is denoted as the grip height H. Here, the reinforcing bar arrangement surface F is a surface on which the binding object is arranged. For example, as shown with the dotted line in FIG. 1, the reinforcing bar arrangement surface may be a surface connecting centers of sections of an upper reinforcing bar of two reinforcing bars S arranged on upper and lower sides. The upper reference position of the grip height H is preferably a position on the grip axis A3L, as shown with the dotted line in FIG. 1, in a case where the grip axes A3L and A3R are orthogonal or substantially orthogonal to the axis line A1 of the twisting shaft 253. In a case where the grip axes A3L and A3R are not orthogonal or substantially orthogonal to the axis line A1 of the twisting shaft 253, any point on the grip axes A3L and A3R, for example, a center position may be set as the upper reference position of the grip height H.

As shown in FIG. 1, the second body part 200 has a second housing 202, a reel accommodation part 210 configured to accommodate a wire reel 211 on which the wire W is wound, a wire feeding unit 220 configured to reel out and feed the wire W from the wire reel 211 accommodated in the reel accommodation part 210, a curl guide 230A configured to curl the wire W around the binding object, a cutting unit 240 configured to cut the wire W curled by the curl guide 230A, and a twisting unit 250 configured to twist the wire W curled by the curl guide 230A and cut by the cutting unit 240. The curl guide 230A is provided at a tip end portion of the second housing 202, and the wire feeding unit 220, the cutting unit and the twisting unit 250 are accommodated in the second housing 202. The second body part 200 also has a contact member 233 configured to actuate a second guide part 232A (which will be described later) of the curl guide 230A as the reinforcing bars S are contacted thereto, and a cover part 206 configured to cover a lower end portion of the second housing 202.

The wire feeding unit 220 is provided between the reel accommodation part 210 and the curl guide 230A, and has a pair of feeding gears for feeding the wire. The pair of feeding gears of the wire feeding unit 220 is configured to rotate in forward and reverse directions by drive of a motor (not shown). Thereby, when the feeding gears are rotated in the forward direction, the wire W can be fed toward the curl guide 230A, and when the feeding gears are rotated in the reverse direction, the wire W can be pulled back toward the reel accommodation part 210.

The curl guide 230A has an opening 260 in which the reinforcing bars S can be inserted, and is configured to curl the wire W around the reinforcing bars S inserted in the opening 260. The curl guide 230A is provided projecting further forward (in a first direction D1 that is a plane direction of the first body part) from the tip end portion of the second housing 202, and is constituted by a pair of guide parts, i.e., a first guide part 231A and a second guide part 232A. The first guide part 231A and the second guide part 232A are arranged with a prescribed gap L to constitute the opening 260 in a second direction D2 orthogonal to the first direction D1. The first guide part 231A is configured to regulate an advancing direction of the wire W fed from the wire feeding unit 220 and to curl the wire W. The second guide part 232A is configured to receive the wire W curled by the first guide part 231A and to guide the wire to the twisting unit 250. When binding the reinforcing bars S, the reinforcing bars S are inserted into the opening 260 between the first guide part 231A and the second guide part 232A.

As shown in FIGS. 6A and 6B, the cover part 206 is constituted by a metal plate member, and is attached to cover a lower end portion of the second housing 202 between a base end-side of the first guide part 231A and a base end-side of the second guide part 232A.

The contact member 233 is rotatably supported by a shaft 236 attached to the cover part 206. The contact member 233 is a dog leg-shaped member, and has a pair of contact parts 234 (only one contact part is shown in FIGS. 6A and 6B), to which the reinforcing bars are contacted, on the first guide part 231A-side and a pressing part 235 extending toward the second guide part 232A with the shaft 236 being interposed therebetween.

The contact parts 234 are arranged at positions at which the reinforcing bars S inserted in the opening 260 can contact, and the pressing part 235 is in contact with the second guide part 232A. When the contact parts 234 are pressed to the reinforcing bars S and are thus moved in an opposite direction to the first direction D1, the contact member 233 rotates about the shaft 236 as a support point. When the contact member 233 rotates as the contact parts 234 are pressed to the reinforcing bars S, the pressing part 235 pushes the second guide part 232A toward the first guide part 231A. Thereby, the second guide part 232A moves from an open position opened with respect to the first guide part 231A to a closed position. In this way, since the second guide part 232A is open with respect to the first guide part 231 until the reinforcing bars S are contacted to the contact parts 234, the reinforcing bars S can be easily inserted into the opening 260 of the curl guide 230A. In particular, in the reinforcing bar binding machine 1A having a long entire length, like the present embodiment, since a binding position is distant from the operator, it is difficult to insert the reinforcing bars S. For this reason, when the second guide part 232A is open upon the binding, the reinforcing bars S can be easily inserted into the opening 260 of the curl guide 230A.

The twisting unit 250 includes a twisting motor 251, a deceleration mechanism 252 configured to perform deceleration and torque amplification of the twisting motor 251, a twisting shaft 253 connected to the deceleration mechanism 252 and configured to rotate by rotation of the twisting motor 251, a movable member 254 configured to be displaced by a rotating operation of the twisting shaft 253, and a holding part 255 projecting from a tip end-side of the movable member 254 and configured to hold and twist the wire W.

An outer peripheral surface of the twisting shaft 253 and an inner peripheral surface of the movable member 254 are each formed with screws, so that the screw of the twisting shaft 253 is in mesh with the screw of the movable member 254. When the twisting shaft 253 rotates in a state where rotation of the movable member 254 is regulated, the movable member 254 moves in the front and rear direction, and when the regulation of rotation is released, the movable member rotates integrally with the twisting shaft 253.

The holding part 255 has a plurality of claw portions for holding the wire W. The holding part 255 opens and closes as the movable member 254 moves in the front and rear direction, and rotates as the movable member 254 rotates.

The connecting part 300 is an elongated hollow member and has a wiring laid therein. The connecting part 300 is constituted by a rod-shaped member thinner than diameters of the first body part 100 and the second body part 200. A length of the connecting part 300 is selected depending on an average height and the like of the operator, for example. For the connecting part 300, for example, metal such as aluminum and stainless steel and non-metal such as resin, carbon fiber and the like can be used. Thereby, it is possible to reduce an entire weight of the reinforcing bar binding machine 1A.

A base end-side (upper end portion) of the connecting part 300 is attached to the first housing 102, and a tip end-side (lower end portion) of the connecting part 300 is attached to the second housing 202. The connecting part 300 can be configured so that it is detachably attached to the first body part 100 and the second body part 200.

The wiring laid in the connecting part 300 is connected to the battery 142 and the operation switch 160 of the first body part 100 and a control device and the like of the second body part 200. Thereby, communication of electric signals can be performed between the first body part 100 and the second body part 200, and power can be supplied from the first body part 100 to the second body part 200.

[Example of Operation of Reinforcing Bar Binding Machine 1A]

When binding the reinforcing bars S, the operator inserts the reinforcing bars S into the opening 260 between the first guide part 231A and the second guide part 232A, and presses the reinforcing bars S to the contact parts 234 of the contact member 233. Accordingly, the contact member 233 rotates about the shaft 236 as a support point, so that the second guide part 232A is pushed by the pressing part 235 and is moved from the open position to the closed position. The operator turns on the operation switch 160 in a state where the second guide part 232A is closed, so that a binding operation starts.

When the operation switch 160 is turned on, the pair of feeding gears of the wire feeding unit 220 rotates with sandwiching the wire W, thereby delivering the wire W from the wire reel 211 toward the curl guide 230A. The wire W fed by the wire feeding unit 220 is curled by the curl guide 230A, and the curled wire W is then wound several times around the reinforcing bars S. The number of winding times (number of turns) of the wire W around the reinforcing bars S can be set by the setting unit 144. The wire W wound several times on the reinforcing bars S is cut by the cutting unit and is then twisted by the twisting unit 250. By the above operations, the reinforcing bars S can be bound with the wire W.

Subsequently, the details of the grip attaching part 130 of the first body part 100 of the reinforcing bar binding machine 1A of the first embodiment are described with reference to FIGS. 7A and 7B. FIG. 7A is a perspective view depicting an external configuration of the first body part 100, and FIG. 7B is a perspective view depicting an internal configuration of the grip attaching part 130.

The grip attaching part 130 has grip attaching members 135*a* and 135*b*, and the grip attaching members 135*a* and 135*b* are screwed by six screw holes 135 and screws. The grip attaching members 135*a* and 135*b* are each formed with semicircular grooves, so that groove portions matching shapes of the grip connecting portions 121L and 121R are formed in a combined state.

FIG. 7A depicts an outer shape of the first body part 100 in a case where the pair of grips 120L and 120R is attached to the grip attaching part 130 via the grip connecting portions 121L and 121R. FIG. 7B depicts an outer shape of the grip attaching part 130 from which the grip attaching member 135*a* is detached.

The grip attaching part 130 has a plurality of groove portions in the direction of the axis line A1 of the twisting shaft 253. Thereby, the user can vary the grip height H (refer to FIG. 1) in the direction of the axis line A1 of the twisting shaft 253 by changing the groove portions to be used. In the example of FIG. 7B, the groove portions include eight types of four types for the left hand and four types for the right hand of the operator and are bilaterally symmetric.

The grip attaching part 130 has a first right groove 131R to a fourth right groove 134R in which the grip connecting portion 121R is fitted and fixed, and a first left groove 131L to a fourth left groove 134L in which the grip connecting portion 121L is fitted and fixed. The first right groove 131R and the first left groove 131L are each provided on a right upper surface and a left upper surface of the grip attaching part 130. The second right groove 132R and the third right groove 133R are provided on a right side surface of the grip attaching part 130, and the second left groove 132L and the third left groove 133L are provided on a left side surface of the grip attaching part 130. The fourth right groove 134R and the fourth left groove 134L are each provided on a right lower surface and a left lower surface of the grip attaching part 130.

The grip heights H in states where the grip connecting portion 121R is fixed to each of the first right groove 131R, the second right groove 132R, the third right groove 133R and the fourth right groove 134R are each referred to as heights HR1, HR2, HR3 and HR4. Similarly, the grip heights H in states where the grip connecting portion 121L is fixed to each of the first left groove 131L, the second left groove 132L, the third left groove 133L and the fourth left groove 134L are each referred to as heights HL1, HL2, HL3 and HL4. Since the left and right groove portions are bilaterally symmetric, the heights of HR1 and HL1, HR2 and HL2, HR3 and HL3, HR4 and HL4 are the same, respectively. The grip height H is highest in the height HR1 and HL1, and is lower in order of HR2 and HL2, HR3 and HL3, HR4 and HL4.

FIGS. 1 to 5 and 7A depict a state where the grip connecting portions 121L and 121R are each fitted and fixed in the second left groove 132L and the second right groove 132R of the grip attaching part 130. The heights of the grips 120L and 120R are each HL2 and HR2.

The grip height H can be changed by switching the positions of the groove portions of the grip attaching part 130, in which the grip connecting portions 121L and 121R are fixed. When attaching the handle parts 122L and 122R to the grip attaching part 130, in a state (refer to FIG. 7B) where the grip attaching member 135*a* is detached, the grip connecting portions 121L and 121R of the handle parts 122L and 122R are each fitted in any one semicircular groove of the grip attaching member 135*b*. Then, the grip attaching member 135*a* is combined with the grip attaching member 135*b*, which are then screwed by the six screw holes 136 and the screws.

When changing the grip height H, the grip attaching member 135*a* is detached, and the grip connecting portions 121L and 121R of the handle parts 122L and 122R are each fitted in any one groove of the grip attaching member 135*b* corresponding to a desired grip height. Then, the grip attaching member 135*a* is combined with the grip attaching member 135*b* and screwed, so that the handle parts 122L and 122R are fixed to the grip attaching part 130.

In the example of FIG. 7B, the first left groove 131L to the fourth left groove 134L are arranged in a substantially radial pattern around the vicinity (central point) of a central portion of a left part of the grip attaching part 130, and the first right groove 131R to the fourth right groove 134R are similarly arranged in a substantially radial pattern around the vicinity (central point) of a central portion of a right part of the grip attaching part 130.

The first left groove 131L and the first right groove 131R positioned on the upper side of the grip attaching part 130 and the fourth left groove 134L and the fourth right groove 134R positioned on the lower side of the grip attaching part 130 extend in the direction of the axis line A1 of the twisting shaft 253, and constitute the groove portions to which the grips 120L and 120R can be attached.

The extension directions of the groove portions are not limited to the example of FIG. 7B. For example, in order to simplify the structure of the grip attaching part 130, the second left groove 132L and the third left groove 133L position on the left side surface of the grip attaching part 130 and the second right groove 132R and the third right groove 133R positioned on the right side surface may be formed as grooves extending horizontally in the right and left direction.

In addition, in order to simplify the structure of the grip attaching part 130 and to improve the operability when the operator performs an operation with grasping the grip 120L or 120R with one hand, the first right groove 131R and the first left groove 131L positioned on the upper side of the grip attaching part 130 may be formed as grooves extending vertically upward.

Further, the types of the groove portions are not limited to the eight types on the left and right sides as described above. For example, the grooves may be two or more types on any one of the left and right sides or may be three or more types on both sides. In addition, the sectional shape of the groove portion is not limited to the circular or substantially circular shape and may be a polygonal shape such as a quadrilateral shape. The shapes of the grip connecting portions 121L and 121R may be changed according to the shapes of the groove portions and the extension directions of the groove portions.

Subsequently, a configuration example of the reinforcing bar binding machine 1A in a case where the grip height is changed is described with reference to FIGS. 8A to 8C and 9A to 9C.

Figure 8A:
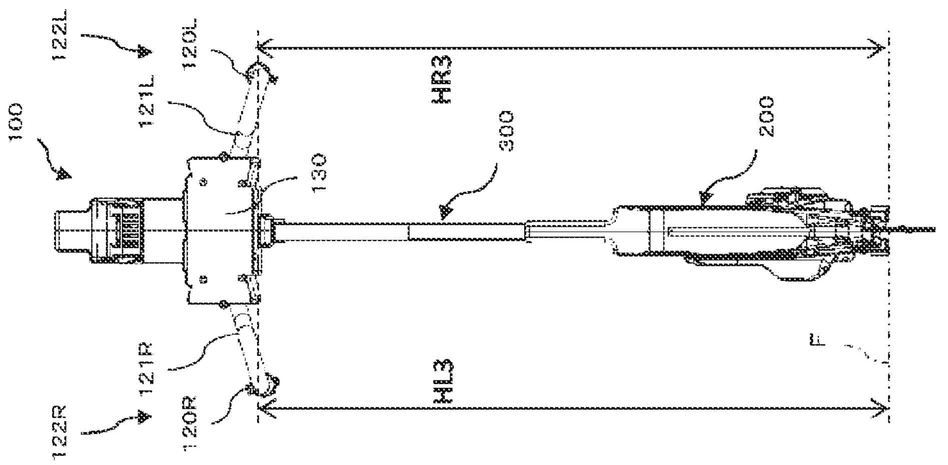
FIG. 8A to FIG. 8C are front views depicting an example of a configuration where a grip height of the reinforcing bar binding machine of the first embodiment is variable.

In an example of FIG. 8A, the grip connecting portions 121R and 121L are each fixed in the third right groove 133R and the third left groove 133L. The grip heights HR3 and HL3 are lower than the grip heights HR2 and HL2 shown in FIG. 3. For this reason, even a short operator can operate the reinforcing bar binding machine 1A with grasping the grips 120R and 120L in a posture that does not impose a burden to the body.

Figure 8B:
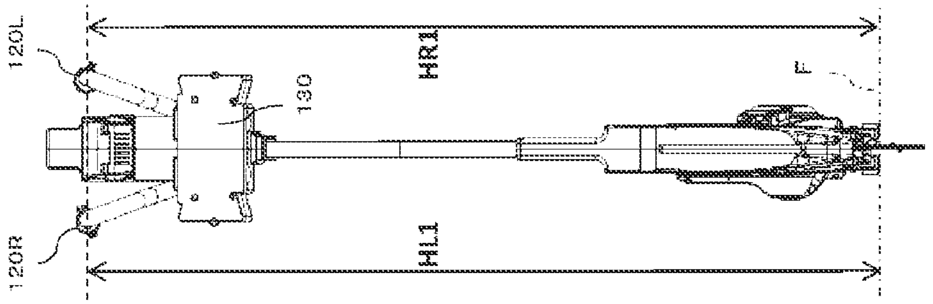

In an example of FIG. 8B, the grip connecting portions 121R and 121L are each fixed in the first right groove 131R and the first left groove 131L. The grip heights HR1 and HL1 are higher than the grip heights HR2 and HL2 shown in FIG. 3. For this reason, even a tall operator can operate the reinforcing bar binding machine 1A with grasping the grips 120R and 120L in a posture that does not impose a burden to the body.

Figure 8C:
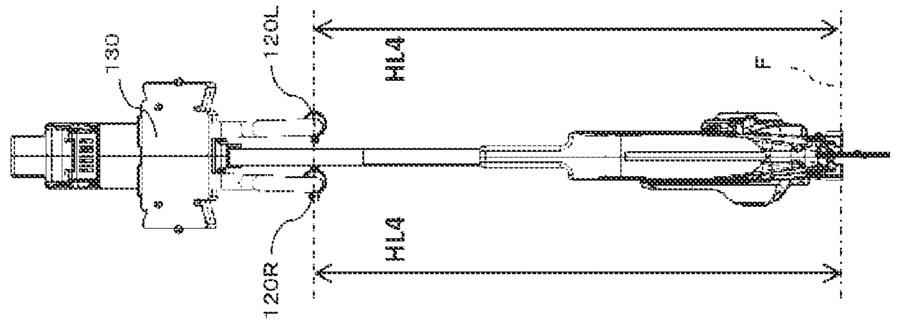

In an example of FIG. 8C, the grip connecting portions 121R and 121L are each fixed in the fourth right groove 134R and the fourth left groove 134L. The grip height HR1 and the height HL1 are lower than the grip heights HR3 and HL3 shown in FIG. 8A. In addition, since the grip connecting portions 121R and 121L make a distance between the grips 120R and 120L smaller than a width of the grip attaching part 130 in the horizontal direction, an accommodation space of the reinforcing bar binding machine 1A can be reduced.

In the above, the example where the heights H of the pair of grips are the same has been described.

In the reinforcing bar binding machine 1A, when the operator performs an operation with grasping the pair of grips, the operator can individually change the heights of one grip and the other grip in the direction of the axis line A1 of the twisting shaft 243. An example where the grip heights H are made different with the left and right hands of the operator is described with reference to FIGS. 9A to 9C.

Figure 9C:
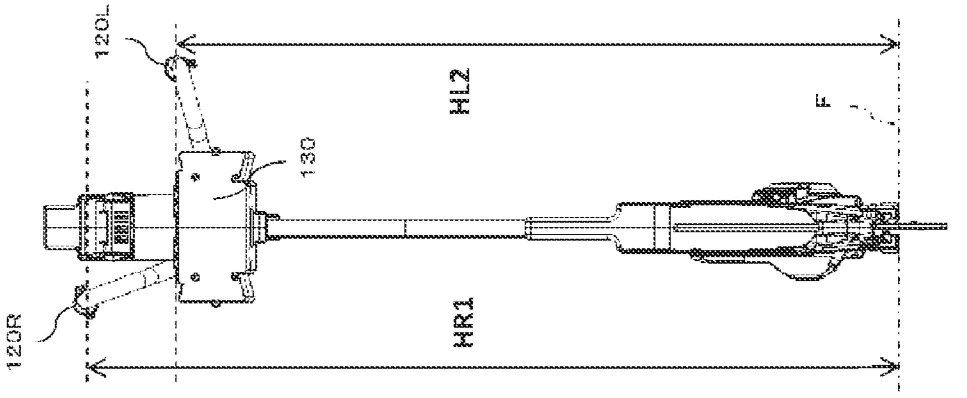
FIG. 9A to FIG. 9C are front views depicting an example of the configuration where the grip height of the reinforcing bar binding machine of the first embodiment is variable.
Figure 9B:
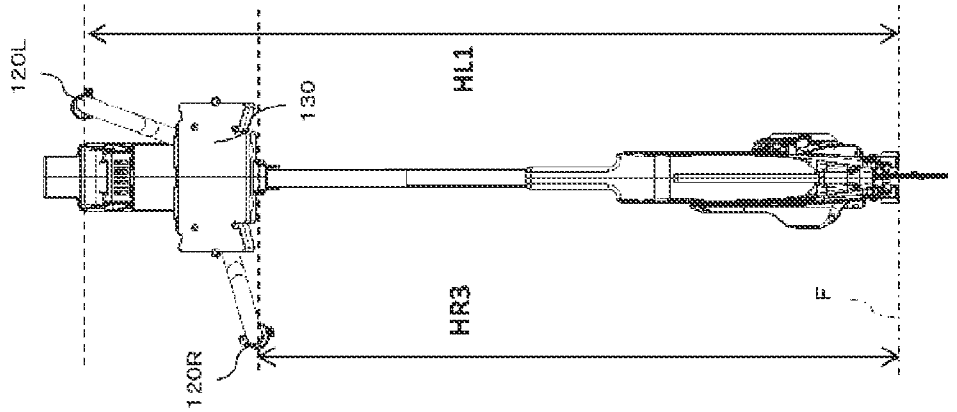
Figure 9A:
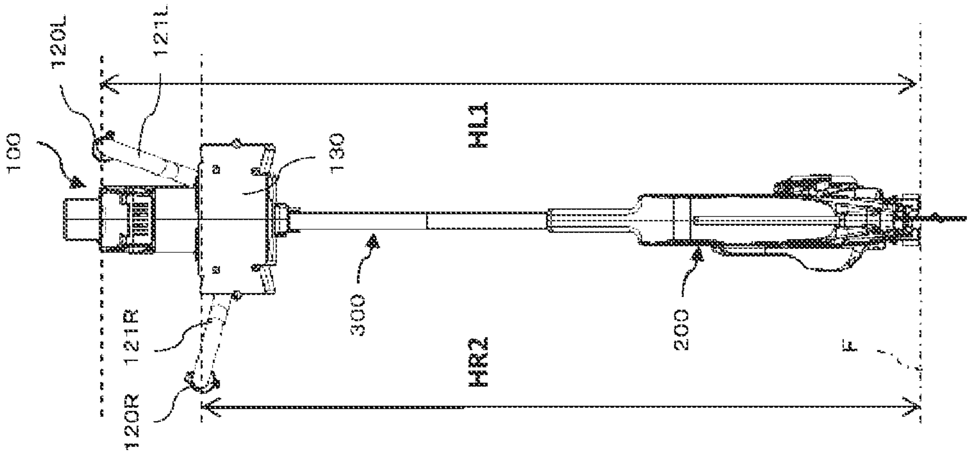

In an example of FIG. 9A, the grip connecting portions 121R and 121L are each fixed in the second right groove 132R and the first left groove 131L. In this way, the height H of the grip 120R can be set to the height HR2 lower than the height HL1 of the grip 120L.

In an example of FIG. 9B, the grip connecting portions 121R and 121L are each fixed in the third right groove 133R and the first left groove 131L. In this way, the height H of the grip 120R can be changed to the height HR3 lower than the height HR2 shown in FIG. 9A.

In an example of FIG. 9C, the grip connecting portions 121R and 121L are each fixed in the first right groove 131R and the second left groove 132L. As compared to the example of FIG. 9A, the heights of the left and right grips are reversed. The operability can be improved by switching the states of FIGS. 9A and 9C according to a difference in dominant hand of the operator, for example.

As for the combinations of the grip heights H of the grips 120L and 120R, combinations other than the combinations shown in FIGS. 8A to 8C and 9A to 9C are also possible. In addition, in FIGS. 8A to 8C and 9A to 9C, the example where the operator grasps the left and right grips 120L and 120R has been described. However, the operator can also operate the reinforcing bar binding machine 1A with grasping only one of the grips 120L and 120R.

For example, in a state where the grip connecting portions 121R and 121L are each fixed in the first right groove 131R and the fourth left groove 134L, the operator may operate the reinforcing bar binding machine 1A with grasping the grip 120R with the right hand or with grasping the grip 120R with the right hand and grasping the grip 120L or the connecting part 300 with the left hand. Alternatively, in a state where only the grip connecting portion 121R is fixed in the first right groove 131R, the operator may perform the operation with grasping the grip 120R with the right hand and grasping the connecting part 300 with the left hand. In a case where an operation space on the right hand-side or left hand-side of the operator is narrow, for example, the operator can perform the operation with grasping only one of the left and right grips, thereby improving the operability.

[Effects of First Embodiment]

As described above, according to the reinforcing bar binding machine 1A of the first embodiment, it is possible to change the left and right grip positions in the direction of the axis line A1 of the twisting shaft, according to operation situations and the physique, difference in dominant hand and difference in taste of the operator. In this way, since it is not necessary to change the length of the connecting part so as to change the grip heights, it is possible to prevent situations where the internal wiring is complicated and the electrical efficiency is lowered as a length of an electric wire is extended.

In the reinforcing bar binding machine 1A of the first embodiment, the grip height H is changed by fitting and fixing the handle parts 122L and 122R at the positions of the groove portions, which correspond to the desired grip positions, of the plurality of groove portions provided to the grip attaching part 130. Therefore, as compared of the related art where an extended part is fixed by a screw and the like, the structure is more robust and there is no concern that the entire length of the binding machine will be changed due to any deviation during the operation. In addition, as compared to the related art where the telescopic part is extended, an adjustable range of the grip height can be increased. Further, as compared to a method of adjusting the entire length of the binding machine by replacing the connecting part, an operation necessary for the change in grip height is simpler, and an erroneous assembling risk and a wiring disconnection risk can be reduced. The operability is also improved because the operator can easily change the grip height each time the operation environment changes, for example.

In the reinforcing bar binding machine 1A of the first embodiment, the first body part 100 may have a structure where the grip attaching part 130 and the handle parts 122L and 122R are provided, and for the configurations of the second body part 200, the connecting part 300 and the like, the basic configuration of the existing binding machine can be used. For this reason, it is possible to obtain the reinforcing bar binding machine where the wiring in the connecting part is not complicated and the electric power efficiency is higher than the related art, as compared to a case where the entire length of the binding machine is adjusted by replacing the connecting part.

[Modified Embodiments of First Embodiment]

Note that, in the reinforcing bar binding machine 1A of the first embodiment, the binding operation is enabled to start by turning on the operation switch 160. However, the present invention is not limited thereto. For example, instead of the configuration where the binding operation is enabled to start by turning on the operation switch 160, the binding operation may be enabled to start when it is detected that the reinforcing bars S are contacted to the contact member 233. In this case, the operability is improved because it is not necessary to turn on the operation switch 160 when binding the reinforcing bars S.

In addition, instead of the configuration where the binding operation is enabled to start when the reinforcing bars S are contacted to the contact member 233, the binding operation may be enabled to start when the reinforcing bars S are contacted to the contact member 233 in a state where the operation switch 160 is turned on. In this case, in the state where the operation switch 160 is turned on, the reinforcing bars S can be bound in succession, so that the operability is improved. Further, when the operation switch 160 is not turned on, the binding operation does not start even though the reinforcing bars S are contacted to the contact member, so that a careless binding operation can be suppressed from being executed. Note that, as a specific structure of the modified embodiment, for example, an actuation switch that is switched between on and off states according to the rotating operation of the contact member 233 may be arranged in the vicinity of the contact member 233, and when the actuation switch becomes on, the binding operation may be executed. Examples of the actuation switch include a mechanical switch and a sensor such as a Hall 1C.

When binding the reinforcing bars S, the operator inserts the reinforcing bars S into the opening 260 between the first guide part 231A and the second guide part 232A in a state where the operation switch 160 is turned on. Thereby, when the reinforcing bars S are pressed to the contact parts 234 of the contact member 233 and the contact member 233 rotates about the shaft 236 as a support point and moves to an operation position, for example, a second switch becomes on. A control unit (not shown) provided in the second body part 200 starts the binding operation when both the operation switch 160 and the actuation switch are on. The second guide part 232A is moved from the open position to the closed position by the rotation of the contact member 233.

Second Embodiment

Figure 10A:
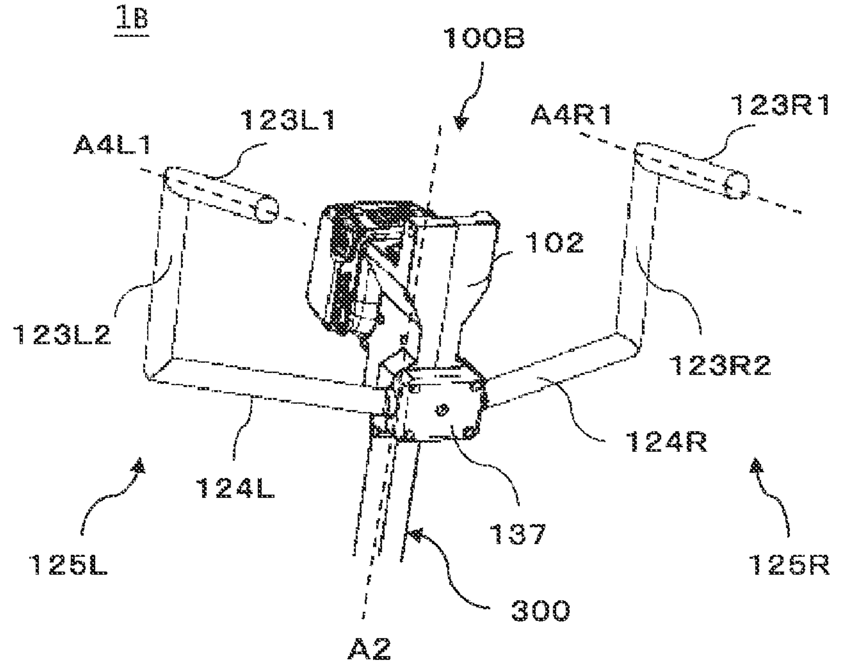
FIG. 10A and FIG. 10B are perspective views depicting an external configuration of a reinforcing bar binding machine of a second embodiment.
Figure 10B:
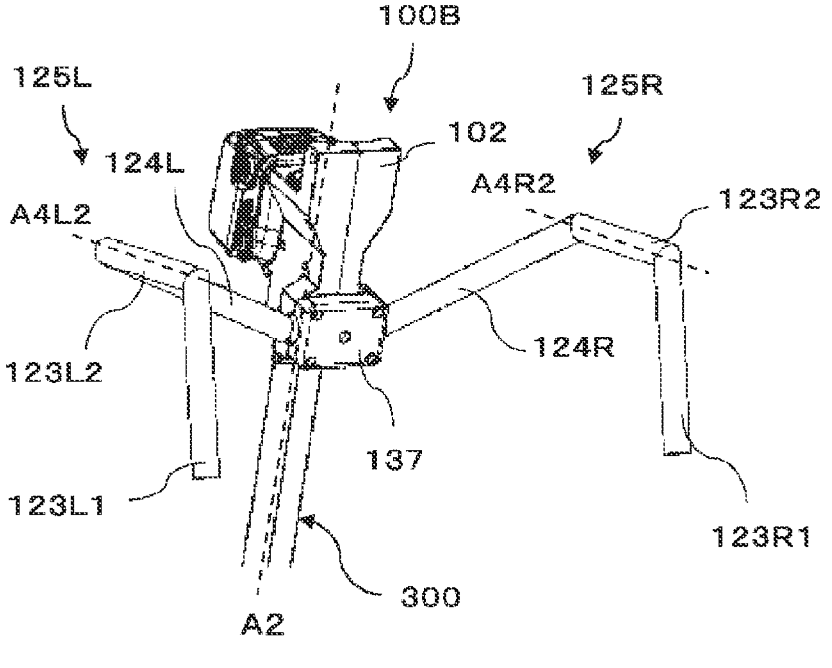
Figure 11A:
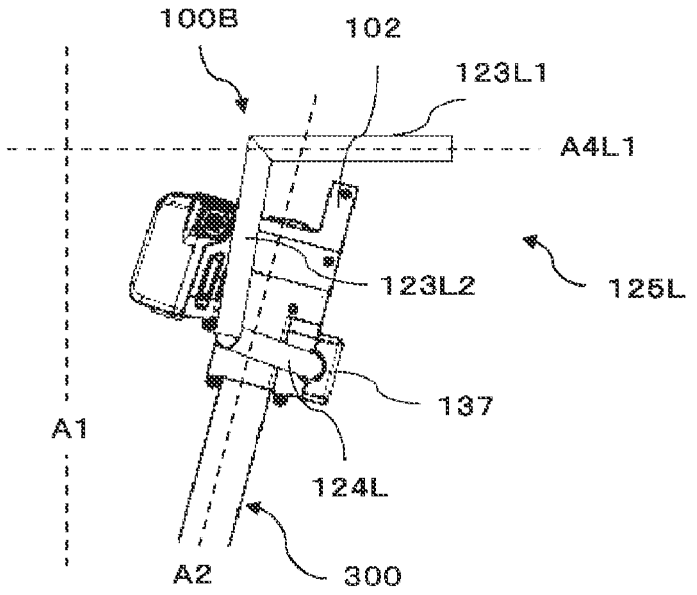
FIG. 11A and FIG. 11B are side views depicting the external configuration of the reinforcing bar binding machine of the second embodiment.
Figure 11B:
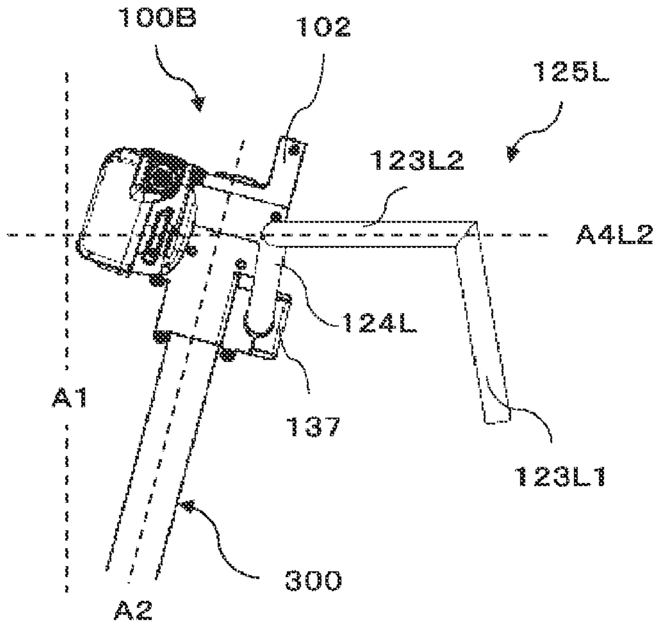

FIGS. 10A and 10B are perspective views depicting an external configuration of a reinforcing bar binding machine 1B of a second embodiment, and FIGS. 11A and 11B are side views depicting the external configuration of the reinforcing bar binding machine 1B of the second embodiment.

The reinforcing bar binding machine 1B of the second embodiment is configured so that the pair of grips is rotatably provided to the first body part and the positions of the grips can be changed in the direction of the axis line A1 of the twisting shaft by rotation. Note that, as for the reinforcing bar binding machine 1B of the second embodiment, the constitutional elements that are substantially common to the reinforcing bar binding machine 1A of the first embodiment described with reference to FIGS. 1 to 9C are denoted with the same reference signs, and the different constitutional elements are specifically described.

[Configuration Example of Reinforcing Bar Binding Machine 1B]

The reinforcing bar binding machine 1B includes a first body part 100B having rotating handle parts 125L and 125R, a second body part 200 having a curl guide 230A having an opening in which a binding object can be inserted and configured to curl the wire W around the binding object inserted in the opening and a twisting unit 250 configured to twist the wire curled by the curl guide 230A, and a connecting part 300 configured to connect the first body part 100B and the second body part 200 each other.

The first body part 100B has the rotating handle parts 125L and 125R, a rotating grip attaching part 137, a first housing 102 configured to support an upper end-side of the elongated connecting part 300, and a battery mounting part 140 to which a battery 142, which is a power supply, is detachably mounted.

The rotating grip attaching part 137 has a substantially cuboid shape and is attached to a rear surface-side of the first housing 102. Left and right sides of the grip attaching part 130 are each provided with an attachment mechanism for attaching the handle parts 125L and 125R.

The rotating handle parts 125L and 125R provided to the first body part 100B each have a grip portion consisting of a first grip portion and a second grip portion. The grip portion that is grasped with the left hand by the operator has a first grip portion 123L1 and a second grip portion 123L2, and the grip portion that is grasped with the right hand has a first grip portion 125R1 and a second grip portion 125R2. The axes of the first grip portions 123L1 and 123R1 are each referred to as a grip axis A4L1 and a grip axis A4R1. Similarly, the axes of the second grip portions 12312 and 123R2 are referred to as a grip axis A4L2 and a grip axis A4R2.

The rotating handle part 125L has the first grip portion 123L1, the second grip portion 123L2 and a rotating grip connecting portion 124L, and one end of the second grip portion 123L2 is connected to the first grip portion 123L1 and the other end is connected to the rotating grip connecting portion 124L. Similarly, the rotating handle part 125R has the first grip portion 123R1, the second grip portion 123R2 and a rotating grip connecting portion 124R, and one end of the second grip portion 123R2 is connected to the first grip portion 123R1 and the other end is connected to the rotating grip connecting portion 124R. The rotating grip connecting portions 124L and 124R are attached to the rotating grip attaching part 137.

FIGS. 10A and 11A are a perspective view and a side view of the first body part 100B when the operator grasps the first grip portions 123L1 and 123R1 for operating the reinforcing bar binding machine 1B. FIGS. 10B and 11B area perspective view and a side view of the first body part 100B when the operator grasps the second grip portions 123L2 and 123R2 for operating the reinforcing bar binding machine 1B.

As shown in FIGS. 10A and 10B, the first grip portion 123L1 and the second grip portion 123L2 are connected so that the grip axis A4L1 and the grip axis A4L2 are not linear but non-parallel. The first grip portion 123R1 and the second grip portion 123R2 are also connected in a similar manner.

As shown in FIG. 10A, the grip axis A4L1 of the first grip portion 123L1 and the grip axis A4R1 of the first grip portion 123R1 are preferably parallel or substantially parallel to each other. As shown in FIG. 10B, the grip axis A4L2 of the second grip portion 123L2 and the grip axis A4R2 of the second grip portion 123R2 are preferably parallel or substantially parallel to each other.

As shown in FIGS. 11A and 11B, during the operation, the grip axes A4L1 and A4R1 of the first grip portions 123L1 and 123R1 and the grip axes A4L2 and A4R2 of the second grip portions are preferably orthogonal or substantially orthogonal to the axis line A1 of the twisting shaft 253. However, the present invention is not limited thereto. For example, the grip axes may have an upward or downward angle equal to or larger than a substantially orthogonal angle to the axis line A1 of the twisting shaft 253, for example, an angle of 5 degrees or larger. During the operation, the angles of the grip axes A4L1 and A4R of the first grip portions and the grip axes A4L2 and A4R2 of the second grip portions relative to the direction of gravity can also be adjusted as appropriate by changing connecting angles of the first grip portions 123L1 and 123R1 and the second grip portions 123L2 and 123R2 and connecting angles of the second grip portions 123L2 and 123R2 and the rotating grip connecting portions 124L and 124R.

As shown in FIG. 11A, a position at which the grip axes A4L1 and A4R1 of the first grip portions 123L1 and 123R1 are orthogonal or substantially orthogonal to the axis line A1 of the twisting shaft 253 is referred to as a first position. As shown in FIG. 11B, a position at which the grip axes A4L2 and A4R2 of the second grip portions 123L2 and 123R2 are orthogonal or substantially orthogonal to the axis line A1 of the twisting shaft 253 is referred to as a second position.

The rotating grip attaching part 137 has a rotation mechanism (not shown) configured to rotate the rotating handle parts 125L and 125R attached to the left and right sides of the rotating grip attaching part 137, a rotation lock mechanism (not shown) configured to limit a range of a rotating angle and to lock rotation to a predetermined rotating angle, and a rotation lock release switch (not shown) configured to release the rotation lock.

In the reinforcing bar binding machine 1B, the grip portions (the rotating handle parts 125L and 125R) each having the first grip portions 123L1 and 123R1 and the second grip portions 123L2 and 123R2 are rotated relative to the first body part 100B, thereby moving between the first position (FIG. 11A) at which the first grip portions 123L1 and 123R1 are orthogonal to the axis line A1 of the twisting shaft 253 and the second position (FIG. 11B) at which the second grip portions 123L2 and 123R2 are orthogonal to the axis line A1 of the twisting shaft 253.

The height of the grip is configured so that the height of the first grip portion 123L1 at the first position shown in FIG. 11A is higher than the height of the second grip portion 123L2 at the second position shown in FIG. 11B.

In the reinforcing bar binding machine 1B, a grip height changing operation that is performed by the operator is described. When changing the grip position (height) from the first position (the state shown in FIGS. 10A and 11A) to the second position (the state shown in FIGS. 10B and 11B), the operator first operates the rotation lock release switch to release the rotation lock. Then, when the operator grasps and pushes down the first grip portions 123L1 and 123R1, the rotating handle parts 125L and 125R rotate downward. When the rotating handle parts are rotated to a predetermined angle, the rotation lock mechanism of the rotating grip attaching part 137 is operated, so that the rotation is locked. This state is shown in FIGS. 10B and 11B. The operator can also start to operate the reinforcing bar binding machine 1B with grasping the second grip portions 123L2 and 123R2 located at the lower positions than the first grip portions, instead of the first grip portions 123L1 and 123R1. A grip height changing operation in the reverse direction is similar to the above-described operation.

In the above, the case where the heights H of the pair of grips are the same has been described. In the reinforcing bar binding machine 1B, when the operator performs an operation with grasping the pair of grips, the operator can individually change the heights of one grip and the other grip in the direction of the axis line A1 of the twisting shaft 243. That is, the rotating handle parts 125L and 125R can be rotated at the same time or individually. For the individual rotations, the rotating grip attaching part 137 may have the rotation mechanism, the rotation lock mechanism and the rotation lock release switch for each of the rotating handle parts 125L and 125R. Also, the rotating grip attaching part 137 or the rotating handle parts 125L and 125R may be further provided with a switching mechanism and a switching operation switch for switching the simultaneous rotation and the individual rotation of the rotating handle parts 125L and 125R.

In the above, the example where the grip position of the reinforcing bar binding machine 1B is adjusted in the two stages has been described. However, the grip height can also be set to three or more stages. In this case, the rotating grip attaching part 137 has preferably the rotation lock mechanism in which rotating angles of three or more stages are set.

Note that, the first body part 100B may not have the rotating grip attaching part 137, and the rotating handle parts 125L and 125R may be attached to the first housing 102. In this case, the first housing 102 has preferably the rotation mechanism, the rotation lock mechanism and the rotation lock release switch.

[Effects of Second Embodiment]

As described above, according to the reinforcing bar binding machine 1B of the second embodiment, it is possible to change each of the left and right grip heights in the direction of the axis line A1 of the twisting shaft, according to operation situations, and the height, difference in dominant hand and difference in taste of the operator. In this way, since the positions (heights) of the grips themselves can be adjusted without extending the connecting part, it is possible to prevent situations where the internal wiring in the connecting part is complicated and the electrical efficiency is lowered as a length of an electric wire is extended.

In the reinforcing bar binding machine 1B of the second embodiment, the first body part 100B is preferably provided with the rotating grip attaching part 137 and the rotating handle parts 125L and 125R, and for the second body part 200, the connecting part 300 and the like, the basic configurations of the existing binding machine can be used. For this reason, it is possible to obtain the reinforcing bar binding machine where the wiring in the connecting part is not complicated and the electric power efficiency is higher than the related art, as compared to a case where the entire length of the binding machine is adjusted by replacing the connecting part.

In the reinforcing bar binding machine 1B of the second embodiment, since the grip heights can be changed by rotating the rotating handle parts 125L and 125R, it is possible to shorten the operation time necessary for change of the grip positions, as compared to the reinforcing bar binding machine 1A of the first embodiment.

Third Embodiment

Figure 12A:
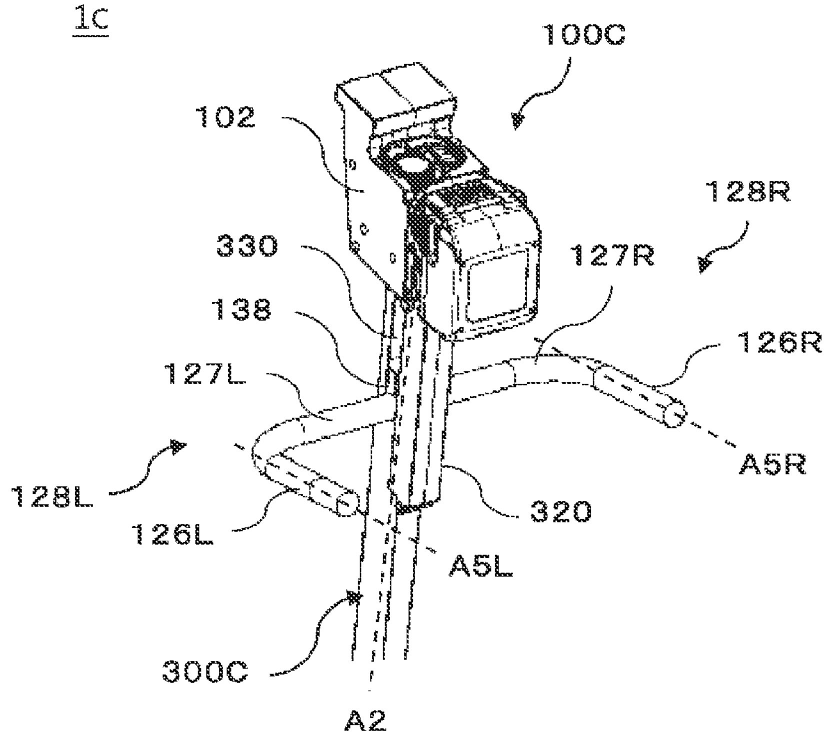
FIG. 12A and FIG. 12B are perspective views depicting an external configuration of a reinforcing bar binding machine of a third embodiment.
Figure 12B:
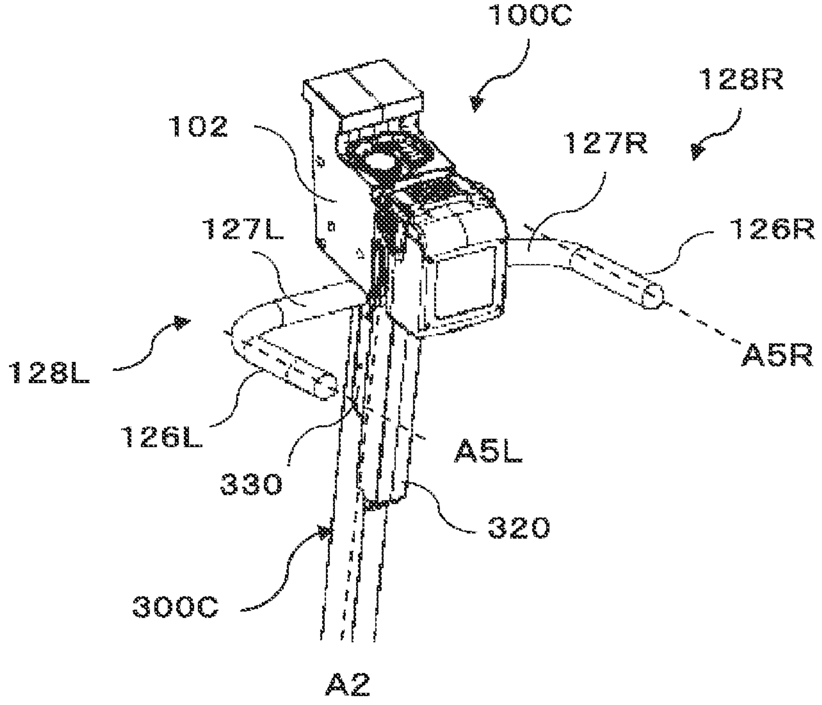
Figure 13A:
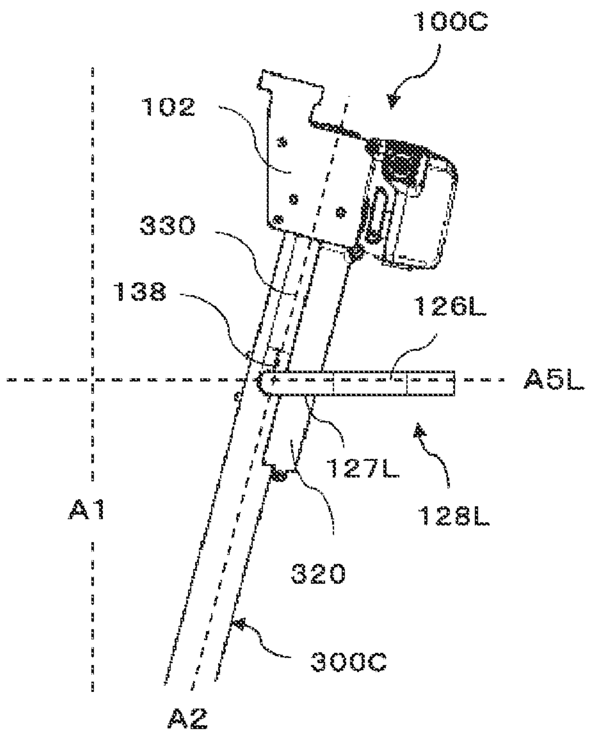
FIG. 13A and FIG. 13B are side views depicting the external configuration of the reinforcing bar binding machine of the third embodiment.
Figure 13B:
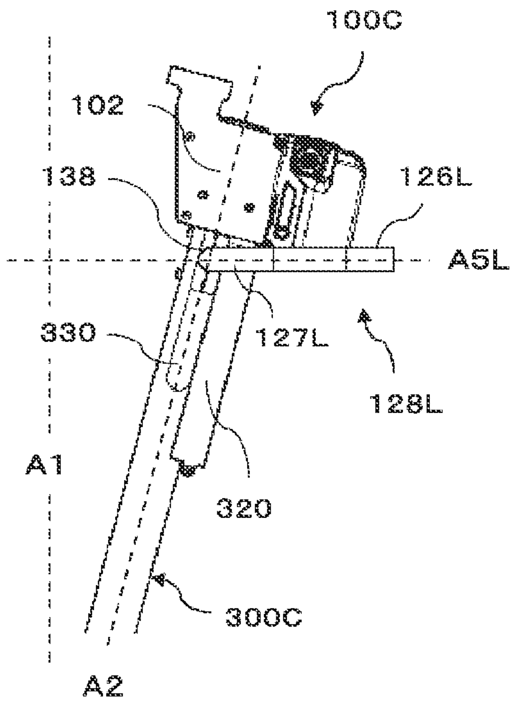

FIGS. 12A and 12B are perspective views depicting an external configuration of a reinforcing bar binding machine 1C of a third embodiment, and FIGS. 13A and 13B are side views depicting the external configuration of the reinforcing bar binding machine 1C. Note that, as for the reinforcing bar binding machine 1C of the third embodiment, the constitutional elements that are substantially common to the reinforcing bar binding machine 1A of the first embodiment described with reference to FIGS. 1 to 9C are denoted with the same reference signs, and the different constitutional elements are specifically described.

[Configuration Example of Reinforcing Bar Binding Machine 1C]

The reinforcing bar binding machine 1C includes a first body part 100C, a second body part 200 having a curl guide 230A having an opening in which a binding object can be inserted and configured to curl the wire W around the binding object inserted in the opening and a twisting unit 250 configured to twist the wire curled by the curl guide 230A, and a connecting part 300C configured to connect the first body part 100B and the second body part 200 each other and having a pair of slide grips 126L and 126R that can be grasped by the operator.

The first body part 100C has a first housing 102 configured to support an upper end-side of the elongated connecting part 300C, and a battery mounting part 140 to which a battery 142, which is a power supply, is detachably mounted.

The connecting part 300C has slide handle parts 128L and 128R having a pair of slide grips 126L and 126R that can be grasped by the operator, a slide grip attaching part 138, a wiring bypass part 320, and a slide groove 330, in addition to the configuration of the connecting part 300 described in the first embodiment. Left and right side parts of the slide grip attaching part 138 are provided with attachment mechanisms for attaching the slide handle parts 128L and 128R.

An axis of the slide grip 126L that is grasped with the left hand by the operator and an axis of the slide grip 126R that is grasped with the right hand are each referred to as a grip axis A5L and a grip axis A5R.

The slide handle part 128L has the slide grip 126L and a slide grip connecting portion 127L, and the slide handle part 128R has the slide grip 126R and a slide grip connecting portion 127R. The slide grips 126L and 126R are each attached to the slide grip attaching part 138 via the slide grip connecting portions 127L and 127R.

FIGS. 12A and 13A area perspective view and a side view of the first body part 100C and the connecting part 300C in a state where the slide grip attaching part 138 to which the slide handle parts 128R and 128L are attached is located on a lower side of the slide groove 330. FIGS. 12B and 13B are a perspective view and aside view of the first body part 100C and the connecting part 300C in a state where the slide grip attaching part 138 to which the slide handle parts 128R and 128L are attached is located on an upper side of the slide groove 330.

The slide grip attaching part 138 is provided in the slide groove 330. The slide groove 330 is provided with a slide mechanism (not shown) configured to slide the slide grip attaching part 138 to which the slide handle parts 128L and 128R are attached in a direction of an axis line A2 of the connecting part 300C, a slide lock mechanism (not shown) configured to limit a sliding range and to lock the sliding at a predetermined position, and a slide lock release switch (not shown) configured to release the lock.

The wiring bypass part 320 is provided so as to connect a wiring laid in the connecting part 300C to the first body part 100C with bypassing the slide groove 330. The wiring bypass part 320 is provided, so that the wiring separates from the slide groove 330. As a result, it is possible to avoid occurrence of a defect such as disconnection of the wiring due to a sliding operation of the slide grip attaching part 138.

The slide grips 126L and 126R are provided on both sides of the axis line A2 of the connecting part 300C, as seen from the operator-side when the operator performs an operation with grasping the slide grips 126L and 126R, and positions of the slide grips 126L and 126R can be changed in the direction of the axis line A1 of the twisting shaft 253.

In order to improve the operability at the time when the operator grasps the slide grips 126L and 126R, as shown in FIGS. 13A and 13B, the grip axes A5L and A5R (which is not shown) of the slide grips during the operation are preferably orthogonal or substantially orthogonal to the axis line A1 of the twisting shaft 253. However, the present invention is not limited thereto. For example, the grip axes may have an upward or downward angle equal to or larger than a substantially orthogonal angle to the axis line A1 of the twisting shaft 253, for example, an angle of 5 degrees or larger.

During the operation, the angles of the grip axes A5L and A5R of the slide grips relative to the direction of gravity can also be adjusted as appropriate by changing connecting angles of the slide grips 126L and 126R and the slide grip connecting portions 127L and 127R.

In the reinforcing bar binding machine 1C, a grip height changing operation that is performed by the operator is described. When changing the grip height from the state shown in FIGS. 12A and 13A to the state shown in FIGS. 12B and 13B, the operator first operates the slide lock release switch to release the lock. Then, when the operator grasps and pushes up the slide grips 126L and 126R, the slide grip attaching part 138 to which the slide handle parts 128L and 128R are attached is slid upward in the direction of the axis line A2 of the connecting part 300 by the slide groove having the slide mechanism. When the sliding is performed up to a predetermined position, the slide lock mechanism of the slide grip attaching part 138 is operated, so that the sliding of the slide grip attaching part 138 is locked. This state is shown in FIGS. 12B and 13B. The operator can also start to operate the reinforcing bar binding machine 1C with grasping the slide grips 126L and 126R having moved to the positions higher than before the change. A grip height changing operation in the reverse direction is similar to the above-described operation.

In the above, the example where the heights H of the pair of grips are the same has been described.

In the reinforcing bar binding machine 1C, when the operator performs an operation with grasping the pair of grips, the operator can individually change the heights of one grip and the other grip in the direction of the axis line A1 of the twisting shaft 243. That is, the slide handle parts 128L and 128R can be slid at the same time or individually. For the individual slides, attachment parts to which the slide handle parts 128L and 128R are individually attached, and slide mechanisms, slide lock mechanisms and slide lock release mechanisms corresponding to the attachment parts may be provided. Also, the slide handle part 128L and 128R may be further provided with a switching mechanism and a switching operation switch for switching the simultaneous sliding and the individual sliding of the slide handle parts 128L and 128R.

In the above, the example where the grip height of the reinforcing bar binding machine 1C is adjusted in the two stages has been described. However, the grip height can also be set to three or more stages. In this case, the slide grip attaching part 138 has preferably the slide lock mechanism in which slide positions of three or more stages are set.

[Effects of Third Embodiment]

As described above, according to the reinforcing bar binding machine 1C of the third embodiment, it is possible to change each of the left and right grip heights in the direction of the axis line A1 of the twisting shaft, according to operation situations, and the height, difference in dominant hand and difference in taste of the operator. In this way, since the grips themselves are moved so as to change the grip positions without extending the connecting part 300C, it is possible to prevent situations where the internal wiring in the connecting part 300C is complicated and the electrical efficiency is lowered as a length of an electric wire is extended.

In the reinforcing bar binding machine 1C of the third embodiment, the connecting part 300C is preferably provided with the slide grip attaching part 138, the slide handle parts 128L and 128R, the slide groove 330 and the like, and for the first body part 100 and the second body part 200, the basic configurations of the existing binding machine can be used. In addition, the wiring bypass part 320 is further provided, so that it is possible to obtain the reinforcing bar binding machine where the wiring in the connecting part 300C is not complicated and the electric power efficiency is higher than the related art, as compared to a case where the entire length of the binding machine is adjusted by replacing the connecting part 300C.

In the reinforcing bar binding machine 1C of the third embodiment, since the grip heights can be changed by sliding the slide handle parts 128L and 128R, it is possible to shorten the operation time necessary for change of the grip positions, as compared to the reinforcing bar binding machine 1A of the first embodiment.

Fourth Embodiment

Figure 14:
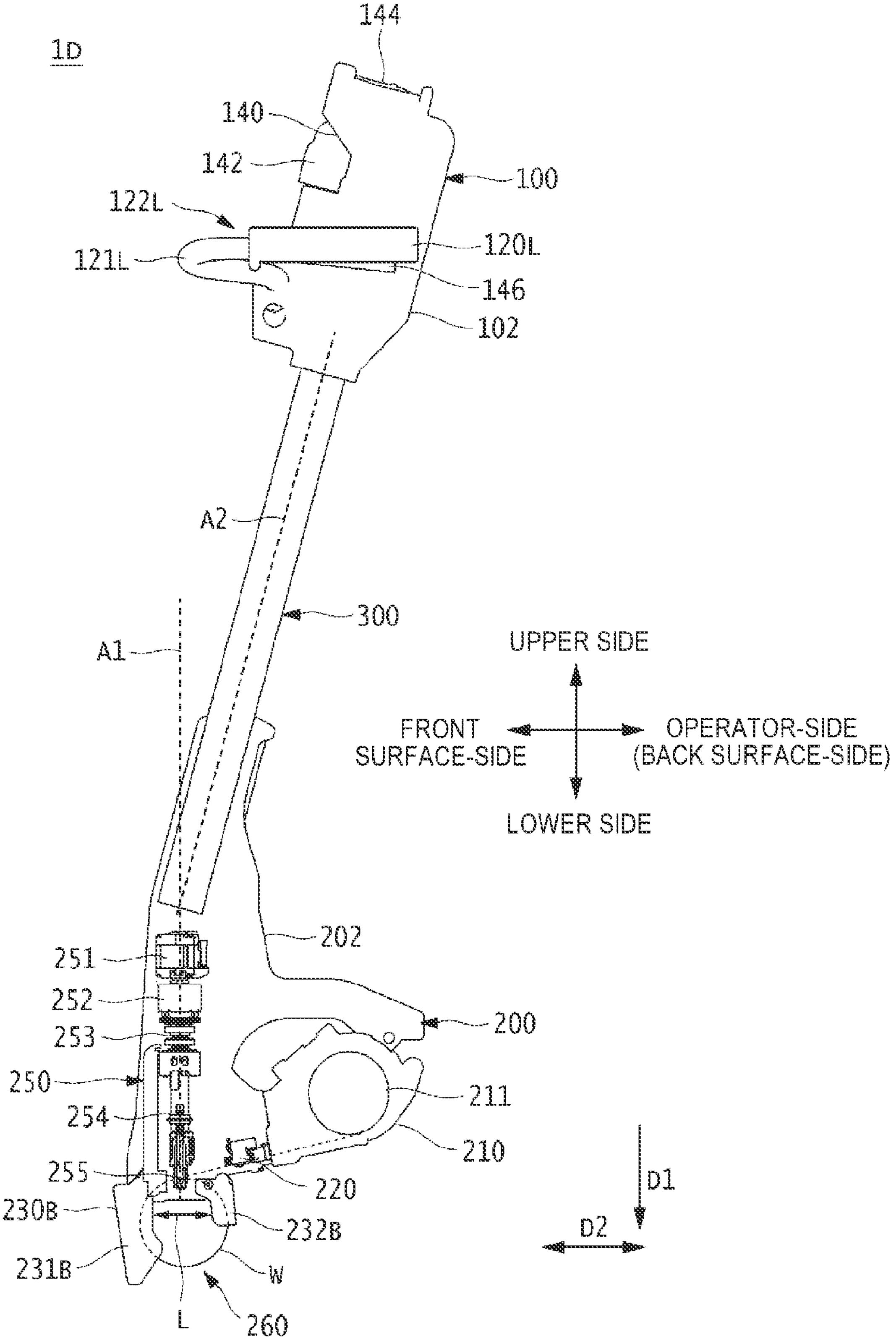
FIG. 14 is a side view depicting an internal configuration of a reinforcing bar binding machine of a fourth embodiment.

FIG. 14 is a side view depicting an internal configuration of a reinforcing bar binding machine 1D of a fourth embodiment. The reinforcing bar binding machine 1D of the fourth embodiment is different from the reinforcing bar binding machine 1A of the first embodiment, in that the contact member 233 is not provided. Since the reinforcing bar binding machine 1D is not provided with the contact member 233, the curl guide 230B is not opened and closed even when the reinforcing bars S are inserted and pulled out with respect to the opening 260. Note that, the reinforcing bar binding machine 1D has a similar configuration to the reinforcing bar binding machine 1A, except that the contact member 233 is not provided.

Fifth Embodiment

In a reinforcing bar binding machine 1E of a fifth embodiment, in particular, a configuration of a first body part 100E is different from the configuration of the first body part 100 of the reinforcing bar binding machine 1A of the first embodiment. Therefore, in the below, as for the reinforcing bar binding machine 1E of the fifth embodiment, the constitutional elements that are substantially common to the reinforcing bar binding machine 1A of the first embodiment described with reference to FIGS. 1 to 9C are denoted with the same reference signs, and the different constitutional elements are specifically described.

[Configuration Example of Reinforcing Bar Binding Machine 1E]

Figure 15:
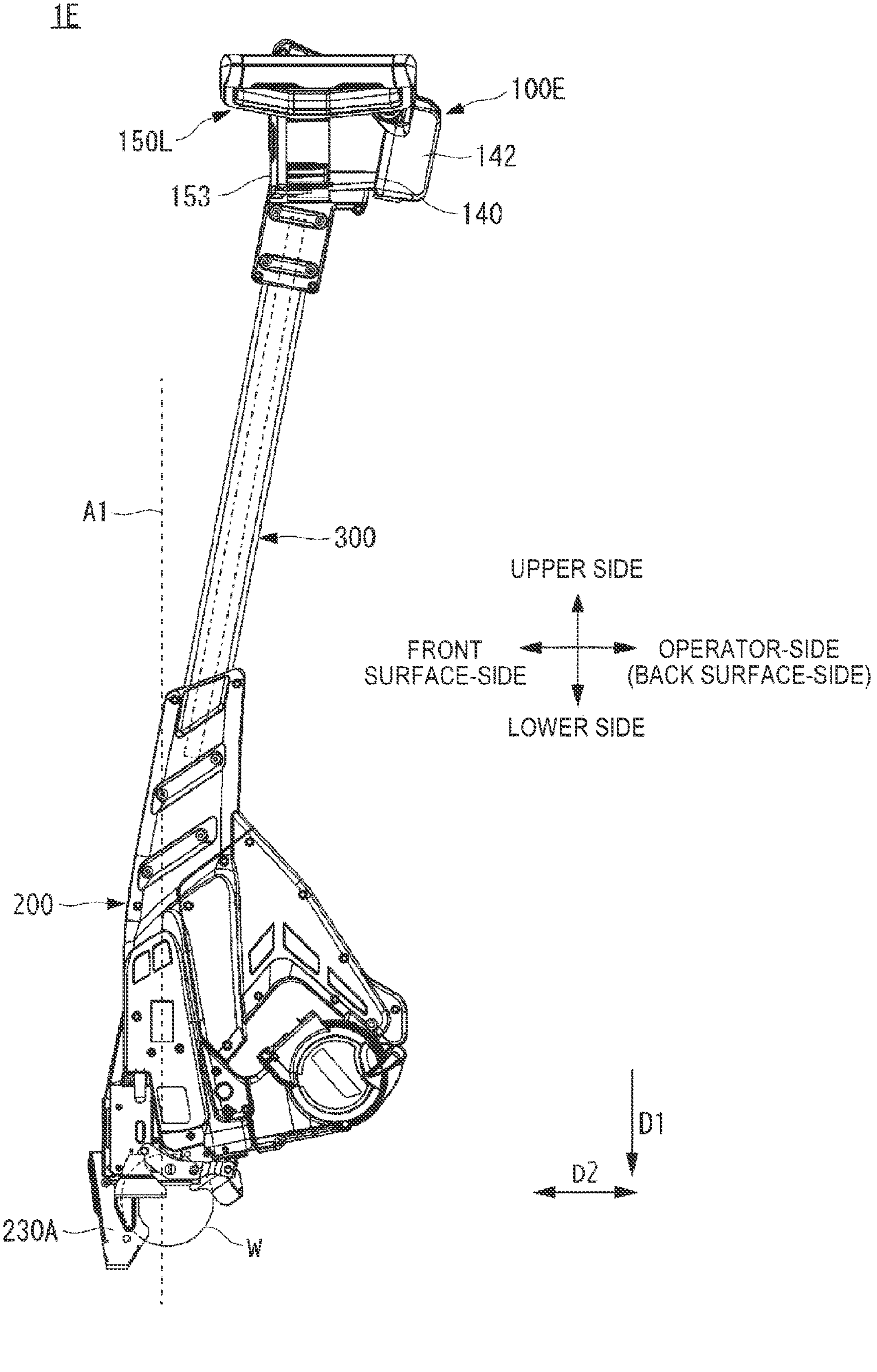
FIG. 15 is a side view depicting an external configuration of a reinforcing bar binding machine of a fifth embodiment.
Figure 16:
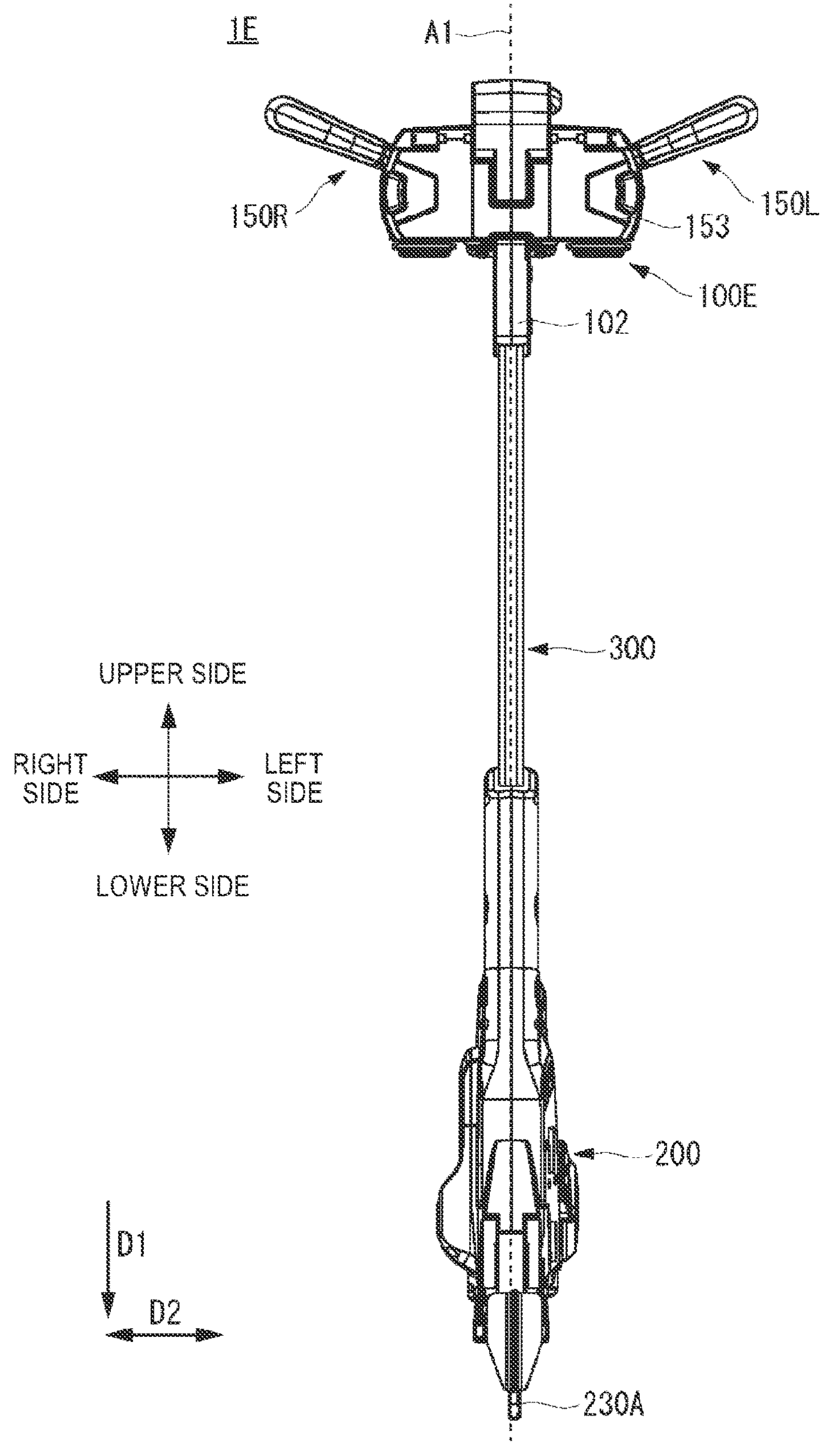
FIG. 16 is a front view depicting the external configuration of the reinforcing bar binding machine of the fifth embodiment.

FIG. 15 is a side view depicting an external configuration of a reinforcing bar binding machine 1E of a fifth embodiment, and FIG. 16 is a front view depicting the external configuration of the reinforcing bar binding machine 1E of the fifth embodiment.

The reinforcing bar binding machine 1E includes a first body part 100E, a second body part 200 having a curl guide 230A having an opening in which a binding object can be inserted and configured to curl the wire W around the binding object inserted in the opening and a twisting unit 250 (refer to FIG. 1) configured to twist the wire curled by the curl guide 230A, and a connecting part 300 configured to connect the first body part 100E and the second body part 200 each other.

The first body part 100E has a pair of handle parts 150R and 150L, a grip attaching part 153 for enabling positions of the handle parts 150R and 150L to be changed in an extension direction of the axis line A1 of the twisting shaft, a first housing 102 configured to support an upper end-side of the elongated connecting part 300, and a battery mounting part 140 to which a battery 142, which is a power supply, is detachably mounted. Note that, since the handle parts 150R and 150L are bilaterally symmetric, the descriptions of one of the handle parts may be simplified or omitted.

FIGS. 17, 18A, 18B, 19 and 20 are perspective views of the first body part 100E of the reinforcing bar binding machine 1E of the fifth embodiment.

The left handle part 150L has a grip 151L that is grasped by the user, and a grip connecting portion 152L connected to the grip 151L. The grip 151L is constituted by a closed ring-shaped body. Note that, the grip 151L is provided with an elongated cylindrical portion 151La that can be easily grasped by the user. However, the operation can also be performed with grasping another portion other than the portion 151La. The portion 151La of the grip 151L may also be constituted by a prismatic body.

Similarly, the right handle part 150R has a grip 151R that is grasped by the user, and a grip connecting portion 152R connected to the grip 151R. The grip 151R is constituted by a closed ring-shaped body. The grip 151R is provided with an elongated cylindrical portion 151Ra that can be easily grasped by the user. However, the operation can also be performed with grasping another portion other than the portion 151Ra. The portion 151Ra of the grip 151R may also be constituted by a prismatic body.

The grip attaching part 153 has a grip attaching member 153*a* and a cover 153*b*. The grip attaching member 153*a* is provided to the first housing 102, and has a plurality of grooves for enabling attachment positions of the grip connecting portions 152R and 152L to be varied. The cover 153*b* is rotatably attached to a support shaft 155 provided to an upper end on the front surface-side of the grip attaching member 153*a*, and is configured to open and close the front surface-side of the grip attaching member 153*a*.

The grip attaching member 153*a* is provided with a first right groove 157R, a first left groove 157L, a second right groove 158R, a second left groove 158L, a third right groove 159R and a third left groove 159L. The first right groove 157R, the second right groove 158R and the third right groove 159R and the first left groove 157L, the second left groove 158L and the third left groove 159L are arranged bilaterally symmetric with respect to an extension direction of the axis line A1 of the twisting shaft, and radially extend from a substantial center of the grip attaching member 153*a*. The plurality of grooves such as the first right groove 157R is each formed to have a substantially angled groove shape on a section in which the grip connecting portion 152R and the like can be fitted. Note that, the shape of the groove may be any shape in which the grip connecting portion 152R can be fitted, and for example, a circular groove shape.

The first right groove 157R extends obliquely right upward from the substantial center of the grip attaching member 153*a*, and the first left groove 157L extends obliquely left upward from the substantial center of the grip attaching member 153*a*. The second right groove 158R extends obliquely right downward from the substantial center of the grip attaching member 153*a*, and the second left groove 158L extends obliquely left downward from the substantial center of the grip attaching member 153*a*. The third right groove 159R extends downward from the substantial center of the grip attaching member 153*a*, and the third left groove 159L extends downward from the substantial center of the grip attaching member 153*a*.

Figure 18A:
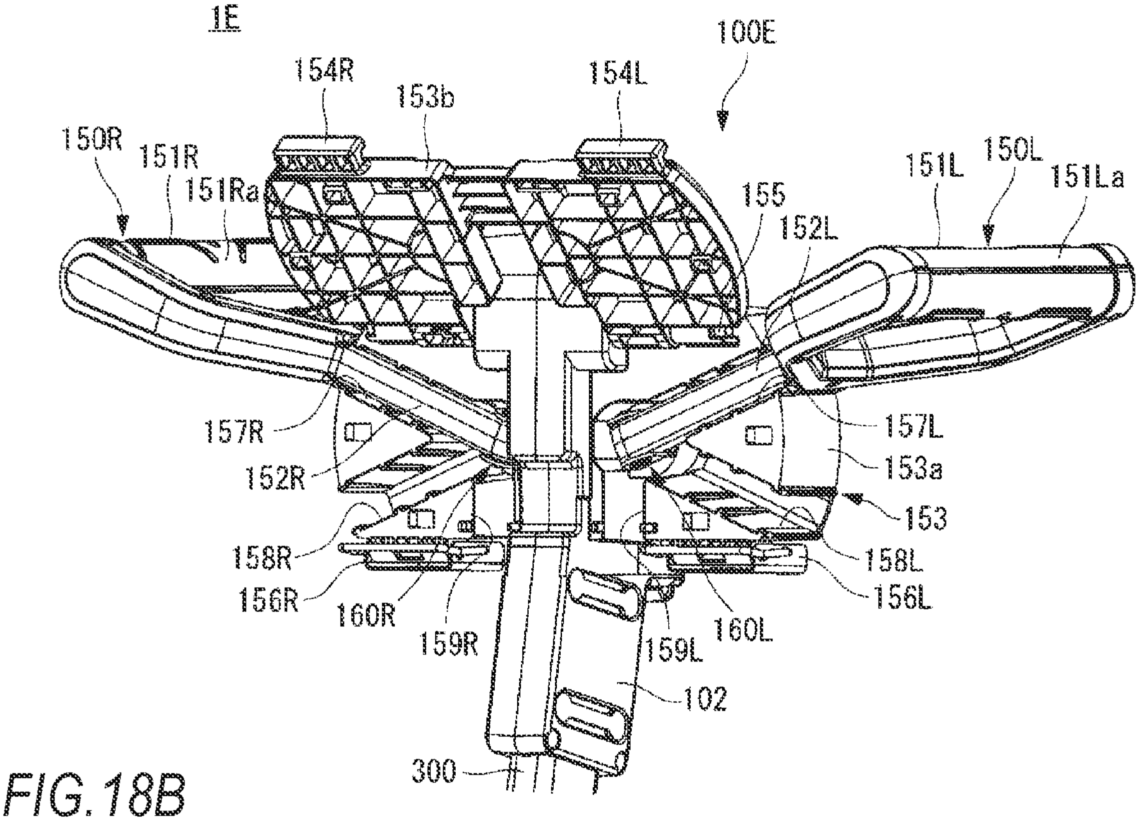
FIG. 18A and FIG. 18B are perspective views of the first body part of the reinforcing bar binding machine of the fifth embodiment.
Figure 18B:
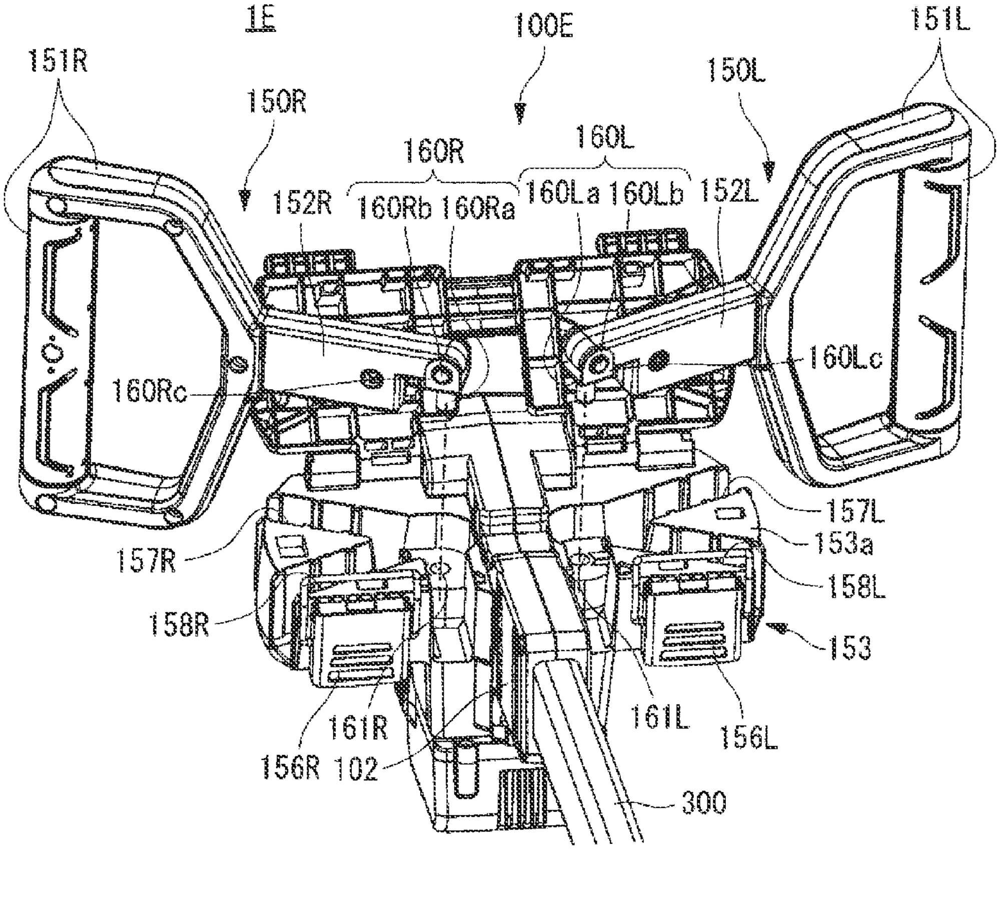

As shown in FIG. 18B, a biaxial hinge 160L is provided at an end portion of the grip connecting portion 152L on an opposite side to the grip 151L. The biaxial hinge 160L includes a first shaft 160La and a second shaft 160Lb. The first shaft 160La is configured so that it can be inserted and pulled out with respect to a hole 161L formed in the grip attaching member 153*a*, and rotates about an axis direction of the hole 161L. The second shaft 160Lb is attached to the first shaft 160La via a support member 160Lc, and rotates about a direction orthogonal to the first shaft 160La.

Similarly, a biaxial hinge 160R is provided at an end portion of the grip connecting portion 152R on an opposite side to the grip 151R. The biaxial hinge 160R includes a first shaft 160Ra and a second shaft 160Rb. The first shaft 160Ra is configured so that it can be inserted and pulled out with respect to a hole 161R formed in the grip attaching member 153*a*, and rotates about an axis direction of the hole 161R. The second shaft 160Rb is attached to the first shaft 160Ra via a support member 160Rc, and rotates about a direction orthogonal to the first shaft 160Ra.

Note that, in the fifth embodiment, similarly to the first embodiment, the grip heights H in states where the grip connecting portion 152R is fixed in each of the first right groove 157R, the second right groove 158R and the third right groove 159R are each referred to as heights HR2, HR3 and HR4. Also, the grip heights H in states where the grip connecting portion 152L is fixed in each of the first left groove 157L, the second left groove 158L and the third left groove 159L are each denoted as HL2, HL3 and HL4.

[Example of Operation of Reinforcing Bar Binding Machine 1E]

Subsequently, an example of the operation of the reinforcing bar binding machine 1E that is performed when changing the grip height H from the height HL2 to the height HL3 is described with reference to FIGS. 17 to 20.

Figure 17:
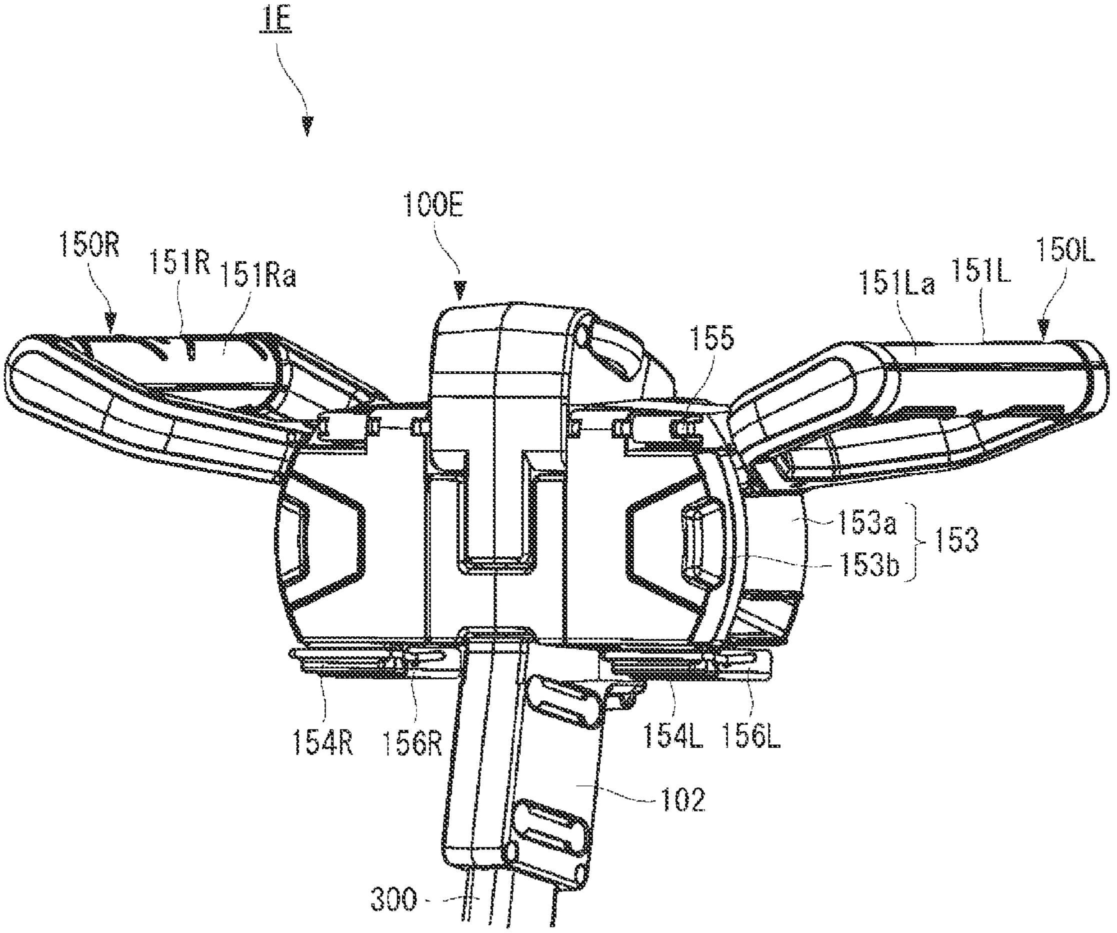
FIG. 17 is a perspective view of a first body part of the reinforcing bar binding machine of the fifth embodiment.

As shown in FIG. 17, in a case where the handle parts 150R and 150L are located at the height HL2, the grip connecting portion 152R is fixed to the first right groove 157R, and the grip connecting portion 1521 is fixed to the first left groove 157L.

First, as shown in FIG. 18A, the user detaches right and left lock parts 156R and 156L from attaching parts 154R and 154L of the cover 153*b* to open the cover 153*b* with respect to the grip attaching member 153*a*, thereby exposing the front surface-side of the grip attaching member 153*a*.

Figure 19:
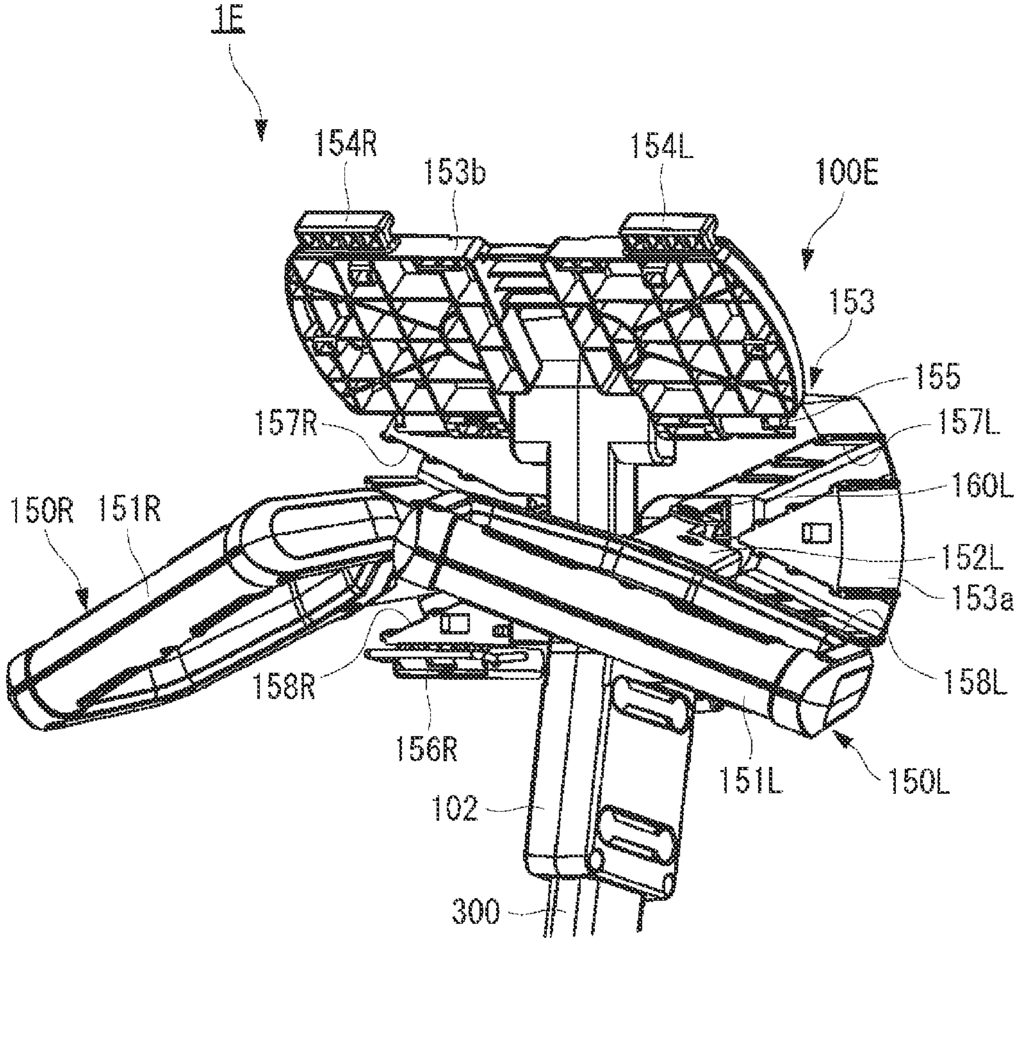
FIG. 19 is a perspective view of the first body part of the reinforcing bar binding machine of the fifth embodiment.

Then, as shown in FIG. 19, the user grasps the grip 151L of the handle part 150L and rotates the grip connecting portion 152L about the direction as an axis center orthogonal to the first shaft 160Ra via the second shaft 160Lb, thereby erecting the grip connecting portion 152L with respect to the grip attaching member 153*a*. Subsequently, the user rotates the grip 151 about the first shaft 160La as a support point from the first left groove 157L-side toward the second left groove 158L, thereby moving the grip connecting portion 152L to a position at which it can be fitted to the second left groove 158L.

Figure 20:
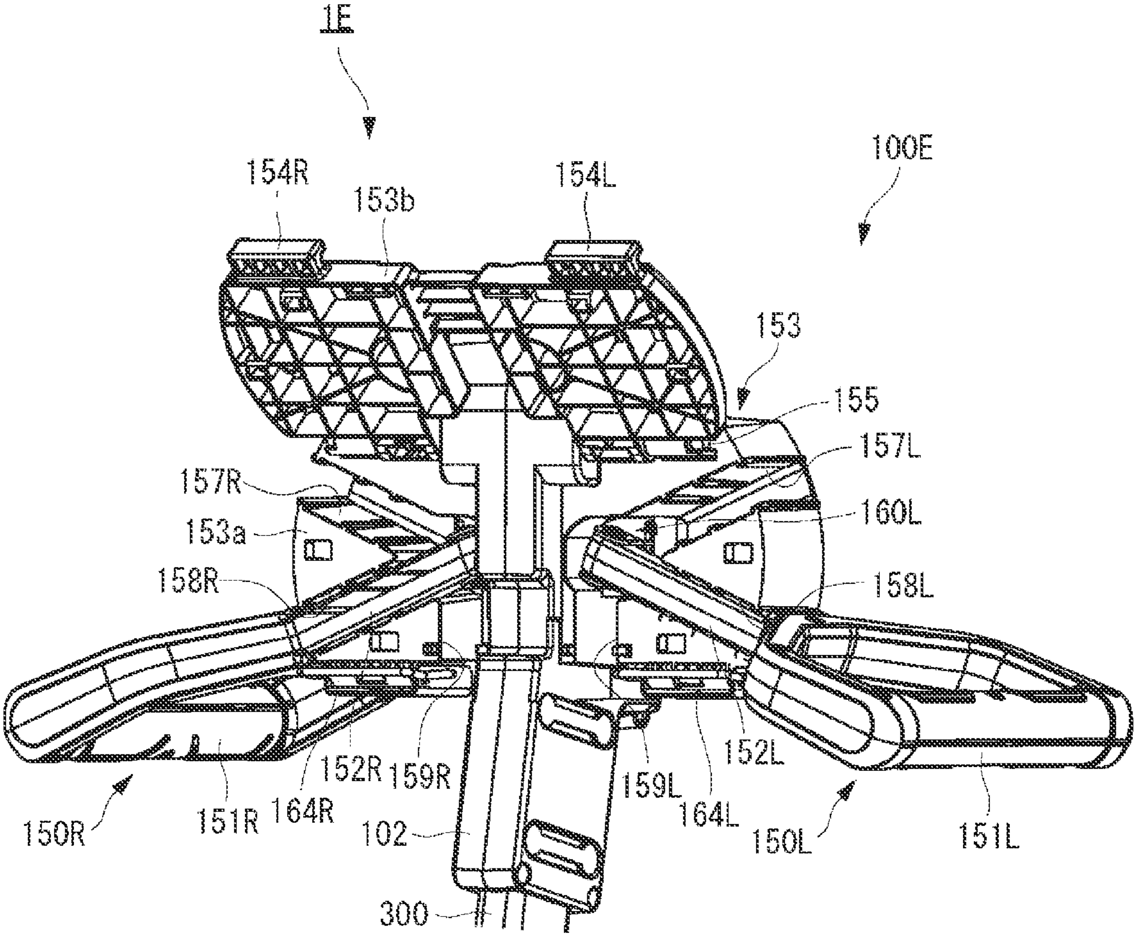
FIG. 20 is a perspective view of the first body part of the reinforcing bar binding machine of the fifth embodiment.

Then, as shown in FIG. 20, while grasping the grip 151L, the user rotates the grip connecting portion 152L about the direction as an axis center orthogonal to the first shaft 160Ra at the first shaft 160La as a support point toward the grip attaching member 153*a*, thereby fitting the grip connecting portion 152L in the second left groove 158L.

Also for the handle part 150R, the user performs a similar operation to the handle part 150L, thereby fitting the grip connecting portion 152R of the handle part 150R in the second right groove 158R. Note that, the user may first perform the diverse operations for any of the right and left handle parts 150R and 150L.

Finally, the user closes the cover 153*b* and attaches the lock parts 156R and 156L to the attaching parts 154R and 154L of the grip attaching member 153*a*, thereby locking the cover 153*b* to the grip attaching member 153*a*. In this way, the grip heights H of the handle parts 150R and 150L can be changed.

As described above, according to the fifth embodiment, similarly to the first embodiment, it is possible to change each of the left and right grip heights H in the extension direction of the axis line A1 of the twisting shaft, according to operation situations, and the height, difference in dominant hand and difference in taste of the operator. In addition, since the grips 151R and 151L are each constituted by the ring-shaped body, even when the reinforcing bar binding machine 1E is put on the reinforcing bars during the operation on the reinforcing bars, the grips 151R and 151 can be prevented from entering and being caught below the reinforcing bars. Thereby, the operation can be performed rapidly and efficiently.

Sixth Embodiment

In a reinforcing bar binding machine 1F of a sixth embodiment, in particular, a configuration of the first body part 100F is different from the configuration of the first body part 100 of the reinforcing bar binding machine 1A of the first embodiment. Therefore, in the below, as for the reinforcing bar binding machine 1F of the sixth embodiment, the constitutional elements that are substantially common to the reinforcing bar binding machine 1A of the first embodiment described with reference to FIGS. 1 to 9C are denoted with the same reference signs, and the different constitutional elements are specifically described.

[Configuration Example of Reinforcing Bar Binding Machine 1F]

Figure 21:
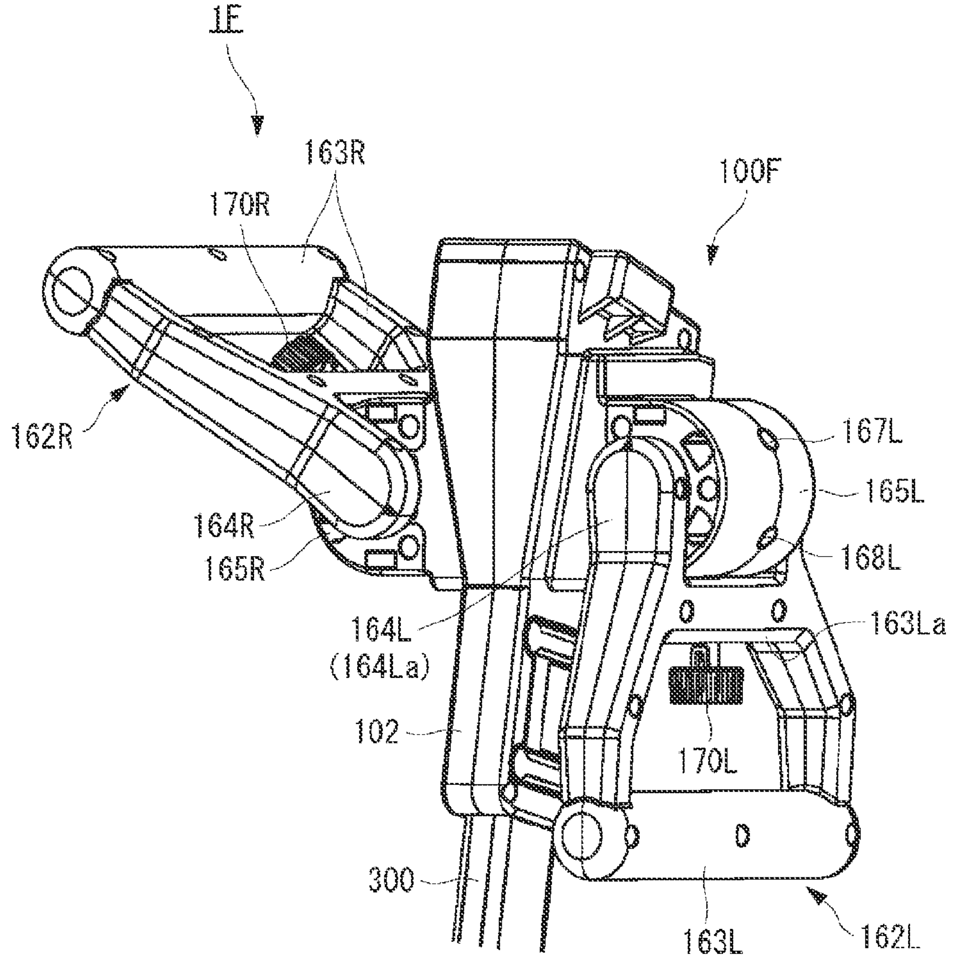
FIG. 21 is a perspective view of a first body part of a reinforcing bar binding machine of a sixth embodiment.
Figure 22A:
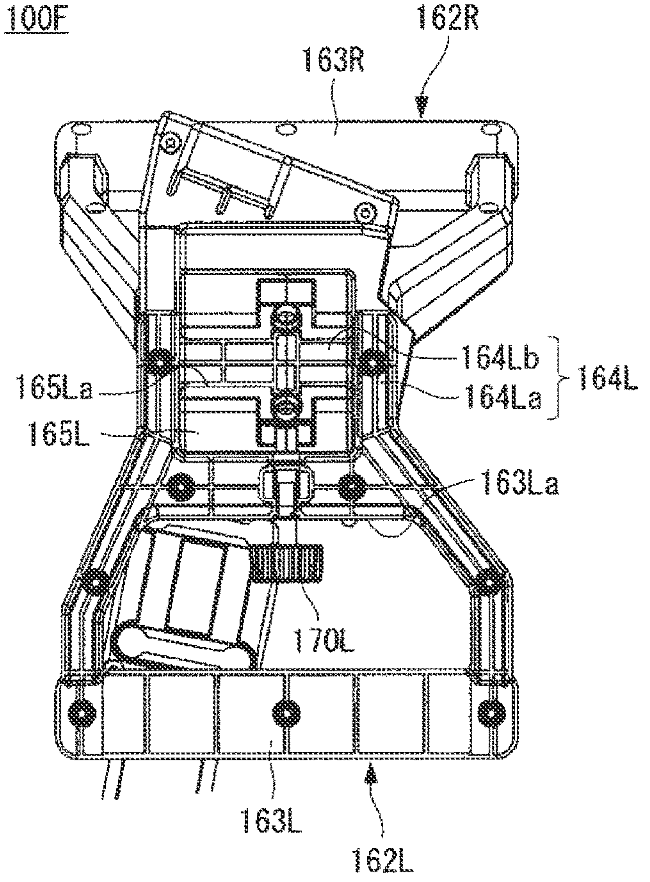
FIG. 22A and FIG. 22B are side views depicting an internal configuration of the first body part of the sixth embodiment.
Figure 22B:
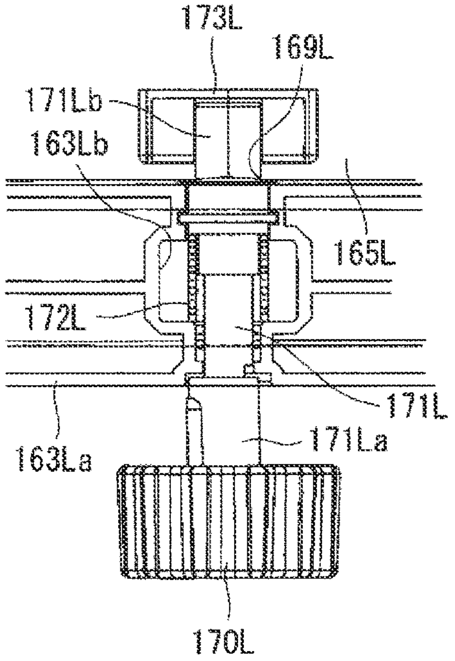

FIG. 21 is a perspective view of a first body part 100F of a reinforcing bar binding machine 1F of a sixth embodiment, FIG. 22A is a side view depicting an internal configuration of the first body part 100F of the sixth embodiment, and FIG. 22B is an enlarged view of main parts of the first body part 100F.

A first body part 100F constituting the reinforcing bar binding machine 1F has a pair of handle parts 162R and 162L, grip attaching parts 165R and 165L configured to enable positions of the handle parts 162R and 162L to be changed in the extension direction of the axis line A1 of the twisting shaft, dials 170R and 170L that are operated when adjusting the grip heights H, and a first housing 102 configured to support an upper end-side of the elongated connecting part 300. Note that, since the handle parts 162R and 162L, the grip attaching parts 165R and 165L and the like are bilaterally symmetric, the descriptions of one of the handle parts may be simplified or omitted.

The left handle part 162L has a grip 163L that is grasped by the user, and a grip connecting portion 164L connected to the grip 163L. The grip 163L is constituted by a closed ring-shaped body. The grip 163L is provided with a dial attaching part 163La for attaching a dial 170L, which will be described later. As shown in FIGS. 22A and 22B, the grip connecting portion 164L has a pair of support portions 164La protruding from the grip 163L toward the grip attaching part 165L, and an attachment shaft 164Lb attached inside the pair of support portions 164La. The attachment shaft 164Lb is inserted in an attachment hole 165La penetrating the grip attaching part 165L in the front and rear direction.

The grip attaching part 165L is constituted by a cylindrical body, for example. A circumferential surface of the grip attaching part 165L is formed with a plurality of a first left opening portion 167L, a second left opening portion 168L and a third left opening portion 169L with predetermined intervals. The first left opening portion 167L is formed on the oblique left upper circumferential surface of the grip attaching part 165L, the second left opening portion 168L is formed on the oblique left lower circumferential surface of the grip attaching part 165L, and the third left opening portion 169L is formed on the lower circumferential surface of the grip attaching part 165L.

Note that, in the sixth embodiment, similarly to the first embodiment, the grip heights H in states where the handle part 162L is fixed in each of the first left opening portion 167L, the second left opening portion 168L and the third left opening portion 169L are referred to as the heights HL2, HL3 and HL4.

As shown in FIG. 22B, a nut 173L is plugged and inserted at substantially the same position as the third left opening portion 169L formed in the grip attaching part 165L, and a hole of the nut 173L and the third left opening portion 169L communicate with each other. Note that, although not shown, nuts are also plugged and inserted at substantially the same positions as the first left opening portion 167L and the second left opening portion 168L of the grip attaching part 165L.

The dial 170L is attached to a surface of the dial attaching part 163La facing toward the grip 163L. Abase end portion 171La of a pin 171L is attached to the dial 170L. A tip end portion 171Lb of the pin 171L is inserted into the third left opening portion 169L of the grip attaching part 165L via a through-hole 163Lb formed in the dial attaching part 163La, and is fastened to the nut 173L arranged on an inner side. The pin 171L is urged toward the grip attaching part 165L by a compression spring 172L arranged in the through-hole 163Lb, and is pushed into the third left opening portion 169L of the grip attaching part 165L in a state where the dial 170L is not pulled.

[Example of Operation of Reinforcing Bar Binding Machine 1F]

Subsequently, an example of the operation of the reinforcing bar binding machine 1F that is performed when changing the grip height H from the height HL4 to the height HL3 is described with reference to FIGS. 21, 22A and 22B.

As shown in FIG. 21 and the like, the user first turns the dial 170L in a direction of loosening the pin 171L. Accordingly, the compression spring 172L is compressed by an operating amount of the dial 170L, and the tip end portion 171Lb of the pin 171L is removed from the nut 173L. Continuously, the user pulls outward the dial 170L. Thereby, the compression spring 172L is further compressed, and the tip end portion 171Lb of the pin 171L comes off from the third left opening portion 169L of the grip attaching part 165L.

Continuously, when the user rotates upward the handle part 162L by a predetermined angle with pulling the dial 170L and the tip end portion 171Lb of the pin 171L thus deviates from the third left opening portion 169L, the user sets free the dial 170L and continues to rotate upward the handle part 162L.

When the tip end portion 171Lb of the pin 171L moves to the second left opening portion 168L of the grip attaching part 165L, the compression spring 172L is extended and the tip end portion 171Lb of the pin 171L is inserted into the second left opening portion 168L of the grip attaching part 165L. The user rotates the dial 170L in a direction of tightening the pin 171L, thereby fastening the tip end portion 171Lb of the pin 171L with the nut 173L and fixing the handle part 162L at the height HL3. In this way, the handle part 162L can be changed from the height HL4 to the height HL3.

Also for the right handle part 162R, a similar operation to the left handle part 162L is performed to change the handle part 162R from the height HL4 to the height HL3.

As described above, according to the sixth embodiment, similarly to the first embodiment, it is possible to change each of the left and right grip heights H in the extension direction of the axis line A1 of the twisting shaft, according to operation situations, and the height, difference in dominant hand and difference in taste of the operator. In addition, since the grips 163R and 163L are each constituted by the ring-shaped body, even when the reinforcing bar binding machine 1F is put on the reinforcing bars during the operation on the reinforcing bars, the grips 163R and 163L can be prevented from entering and being caught below the reinforcing bars. Thereby, the operation can be performed rapidly and efficiently.

Seventh Embodiment

In a reinforcing bar binding machine 1G of a seventh embodiment, in particular, a configuration of a first body part 100G is different from the configuration of the first body part 100 of the reinforcing bar binding machine 1A of the first embodiment. Therefore, in the below, as for the reinforcing bar binding machine 1G of the seventh embodiment, the constitutional elements that are substantially common to the reinforcing bar binding machine 1A of the first embodiment described with reference to FIGS. 1 to 9C are denoted with the same reference signs, and the different constitutional elements are specifically described.

[Configuration Example of Reinforcing Bar Binding Machine 1G]

Figure 23:
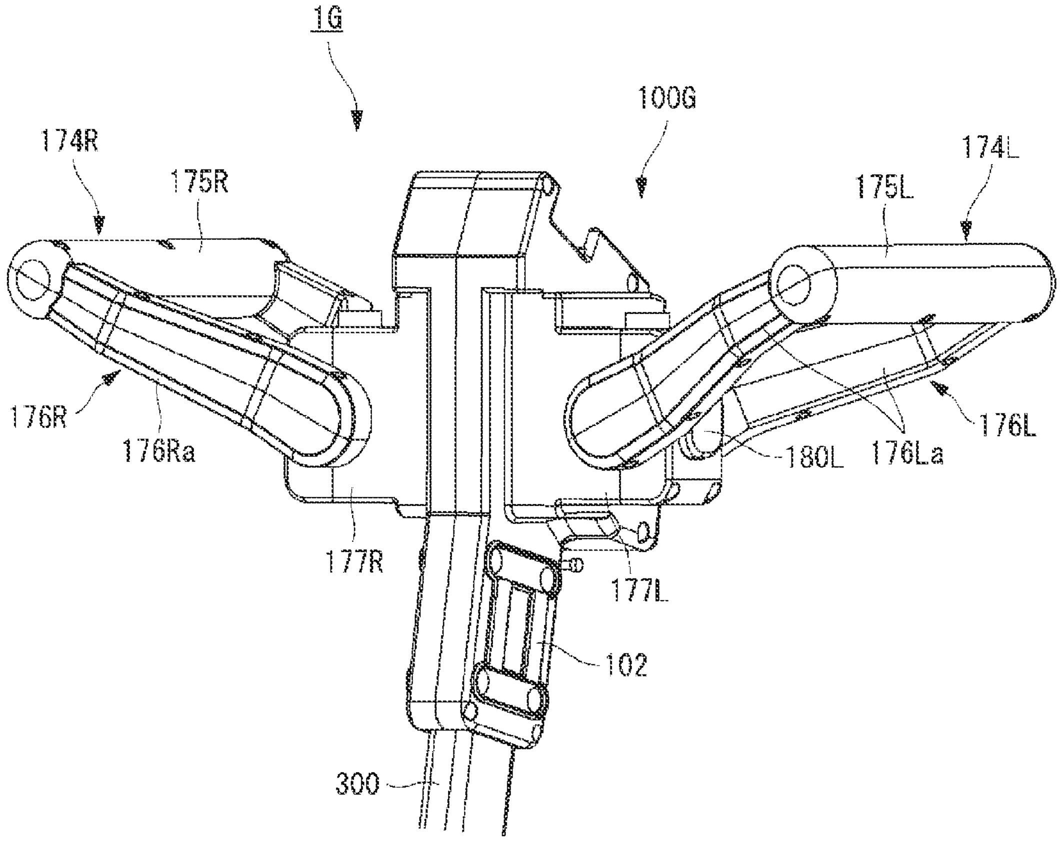
FIG. 23 is a perspective view of a first body part of a reinforcing bar binding machine of a seventh embodiment.
Figure 24:
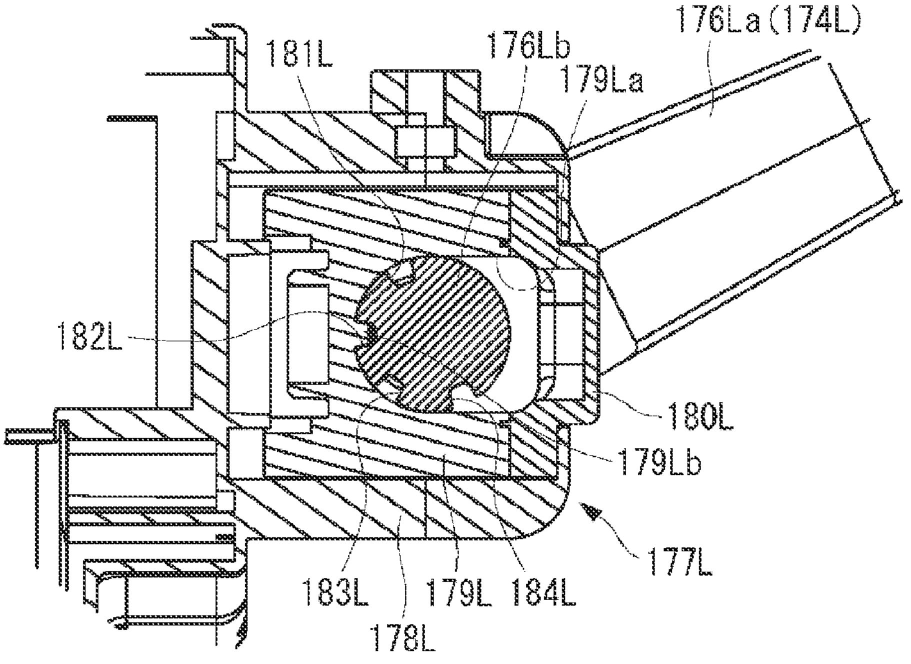
FIG. 24 is a sectional view of a grip attaching part of the seventh embodiment.

FIG. 23 is a perspective view of a first body part 100G of a reinforcing bar binding machine 1G of a seventh embodiment, and FIG. 24 is a sectional view of a grip attaching part 177L of the seventh embodiment.

A first body part 100G constituting the reinforcing bar binding machine 1G has a pair of handle parts 174R and 174L, grip attaching parts 177R and 177L for enabling positions of the handle parts 174R and 174L to be changed in the extension direction of the axis line A1 of the twisting shaft, and a first housing 102 configured to support an upper end-side of the elongated connecting part 300. Note that, since the handle parts 174R and 174L are bilaterally symmetric, the descriptions of one of the handle parts may be simplified or omitted.

The left handle part 174L has a grip 175L that is grasped by the user, and a grip connecting portion 176L connected to the grip 175L. The grip 175L is constituted by an elongated cylindrical body that can be easily grasped by the user. As shown in FIG. 24, the grip connecting portion 176L includes a pair of support portions 176La configured to support the grip 175L, and a support shaft 176Lb attached to the support portions 176La. The pair of support portions 176La is each constituted by a substantially linear member, and each of outer end portions is attached to both end portions of the grip 175L. The support shaft 176Lb is inserted in a concave portion for attachment 179La (which will be described later) of the grip attaching member 179L, and each of end portions thereof is attached to inner end portions of the pair of support portions 176La. In the seventh embodiment, the handle part 174L is constituted by a closed ring-shaped body by the grip 175L, the support portions 176La and the support shaft 176Lb.

Similarly, the right handle part 174R also has a grip 175R and a grip connecting portion 176R. The grip connecting portion 176R includes support portions 176Ra and a support shaft 176Rb. In the seventh embodiment, the handle part 174R is constituted by a closed ring-shaped body by the grip 175R, the support portions 176Ra and the support shaft (not shown).

As shown in FIG. 24, a circumferential surface of the support shaft 176Lb constituting the grip connecting portion 176L is formed with a first concave portion 181L, a second concave portion 182L, a third concave portion 183L and a fourth concave portion 184L for adjusting the grip height H of the handle part 174L. The first concave portion 181L, the second concave portion 182L, the third concave portion 183L and the fourth concave portion 184L are configured to be fitted with the concave portion for attachment 179La formed in the grip attaching part 177L.

The grip attaching part 177L has an accommodation part 178L, a grip attaching member 179L, and a button 180L. The accommodation part 178L is configured to be divided right and left, and the grip attaching member 179L is accommodated therein. The grip attaching member 179L has the concave portion for attachment 179La in which the support shaft 176Lb is inserted, and is configured to rotatably support the support shaft 176Lb via the concave portion for attachment 179La. The concave portion for attachment 179La is formed with a convex portion 179Lb protruding toward the button 180L and capable of fitting with the first concave portion 181L and the like of the grip connecting portion 176L, which will be described later. In addition, the grip attaching member 179L is supported by a spring (not shown), and is in contact with an inner surface of the button 180L with being urged toward the button 180L (left side) by the spring.

The button 180L is provided in contact with a left end face of the grip attaching member 179L, and is pressed by the user when changing the grip height H of the handle part 174L. When the button 180L is pressed, the convex portion 179Lb comes off from the first concave portion 181L or the like, so that the handle part 174L can be rotated.

Note that, in the seventh embodiment, similarly to the first embodiment, the grip heights H of the handle part 174L in cases where the convex portion 179Lb of the grip attaching member 179L is fitted in each of the first concave portion 181L, the second concave portion 182L, the third concave portion 183L and the fourth concave portion 184L of the support shaft 176Lb is each referred to as the heights HL1, HL2, HL3 and HL4. Since the grip heights H of the right handle part 174R can also be defined in a similar manner to the handle part 174L, the detailed description thereof is omitted.

[Example of Operation of Reinforcing Bar Binding Machine 1G]

Subsequently, an example of the operation of the reinforcing bar binding machine 1G that is performed when changing the grip height H from the height HL2 to the height HL3 is described with reference to FIGS. 23 and 24.

As shown in FIG. 23, when the handle part 174L is positioned at the height HL2, the convex portion 179Lb of the grip attaching member 179L is fitted in the second concave portion 182L of the support shaft 176Lb and the handle part 174L is fixed at the height HL2.

When the button 180L is pressed by the user, the button 180L is pushed toward the grip attaching member 179L (inner side). Accordingly, the grip attaching member 179L is also moved toward the inner side against the urging force of the spring (not shown) and the convex portion 179Lb of the grip attaching member 179L comes off from the second concave portion 182L, so that the fitted state of the convex portion 179Lb and the second concave portion 182L is released. Thereby, the handle part 174L is in a rotatable (movable) state.

Continuously, when the button 180L is released in a state where the handle part 174L is rotated clockwise (downward), the circumferential surface of the support shaft 176Lb except the concave portions rotates in contact with the convex portion 179Lb.

When the handle part 174L rotates clockwise, the convex portion 179Lb of the grip attaching member 179L is fitted to the third concave portion 183L of the support shaft 176Lb by urging of the spring (not shown) and the handle part 174L is fixed at the height HL3. In this way, the grip height H of the handle part 174L can be changed from the height HL2 to the height HL3. Note that, also for the right handle part 174R, a similar operation to the operation for the left handle part 174L can be performed to change the grip height H from the height HL2 to the height HL3.

As described above, according to the seventh embodiment, similarly to the first embodiment, it is possible to change each of the left and right grip heights H in the extension direction of the axis line A1 of the twisting shaft, according to operation situations, and the height, difference in dominant hand and difference in taste of the operator. In addition, since the grips 174R and 174L are each constituted by the ring-shaped body, even when the reinforcing bar binding machine 1G is put on the reinforcing bars during the operation on the reinforcing bars, the grips 174R and 174L can be prevented from entering and being caught below the reinforcing bars. Thereby, the operation can be performed rapidly and efficiently.

Eighth Embodiment

In a reinforcing bar binding machine 1H of an eighth embodiment, in particular, a configuration of a first body part 100H is different from the configuration of the first body part 100 of the reinforcing bar binding machine 1A of the first embodiment. Therefore, in the below, as for the reinforcing bar binding machine 1H of the eighth embodiment, the constitutional elements that are substantially common to the reinforcing bar binding machine 1A of the first embodiment described with reference to FIGS. 1 to 9C are denoted with the same reference signs, and the different constitutional elements are specifically described.

[Configuration Example of Reinforcing Bar Binding Machine 1H]

Figure 25:
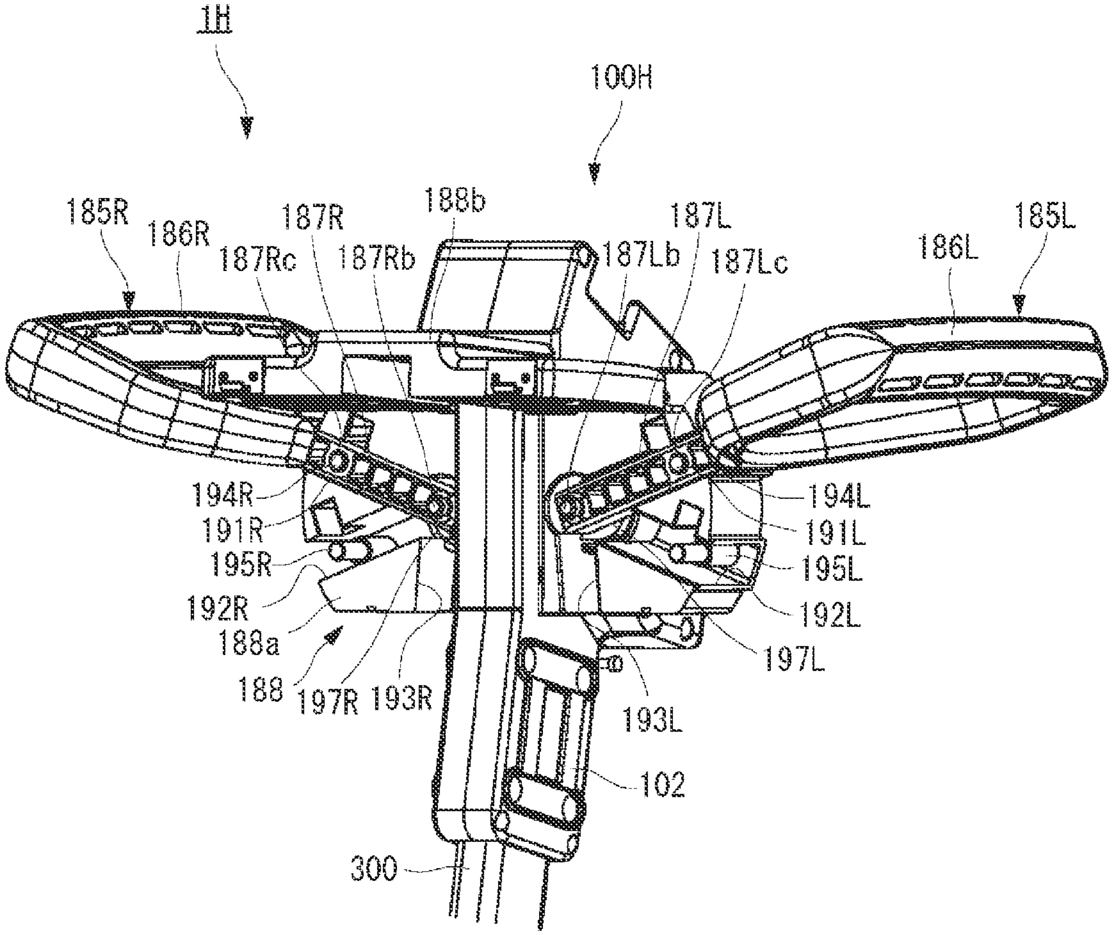
FIG. 25 is a perspective view of a first body part of a reinforcing bar binding machine of an eighth embodiment.
Figure 26:
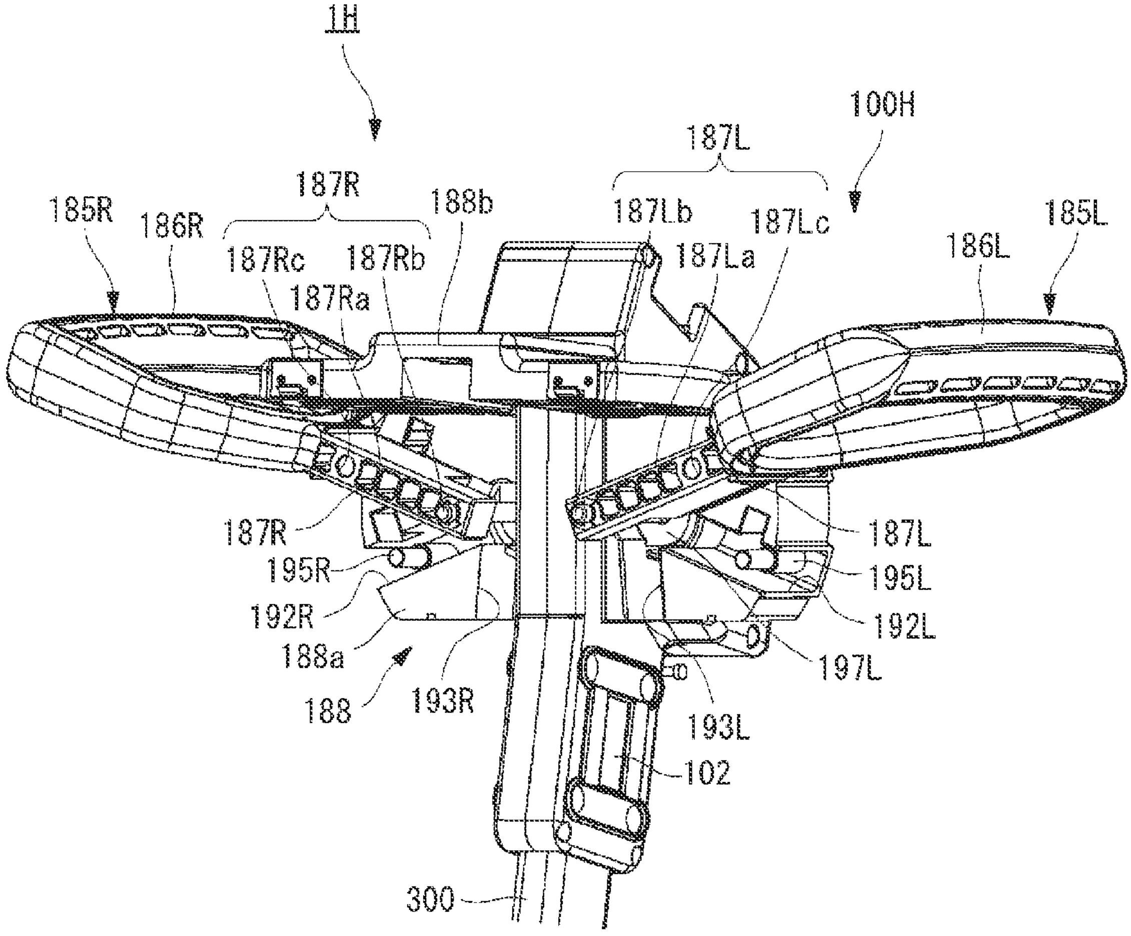
FIG. 26 is a perspective view of the first body part of the reinforcing bar binding machine of the eighth embodiment.
Figure 27:
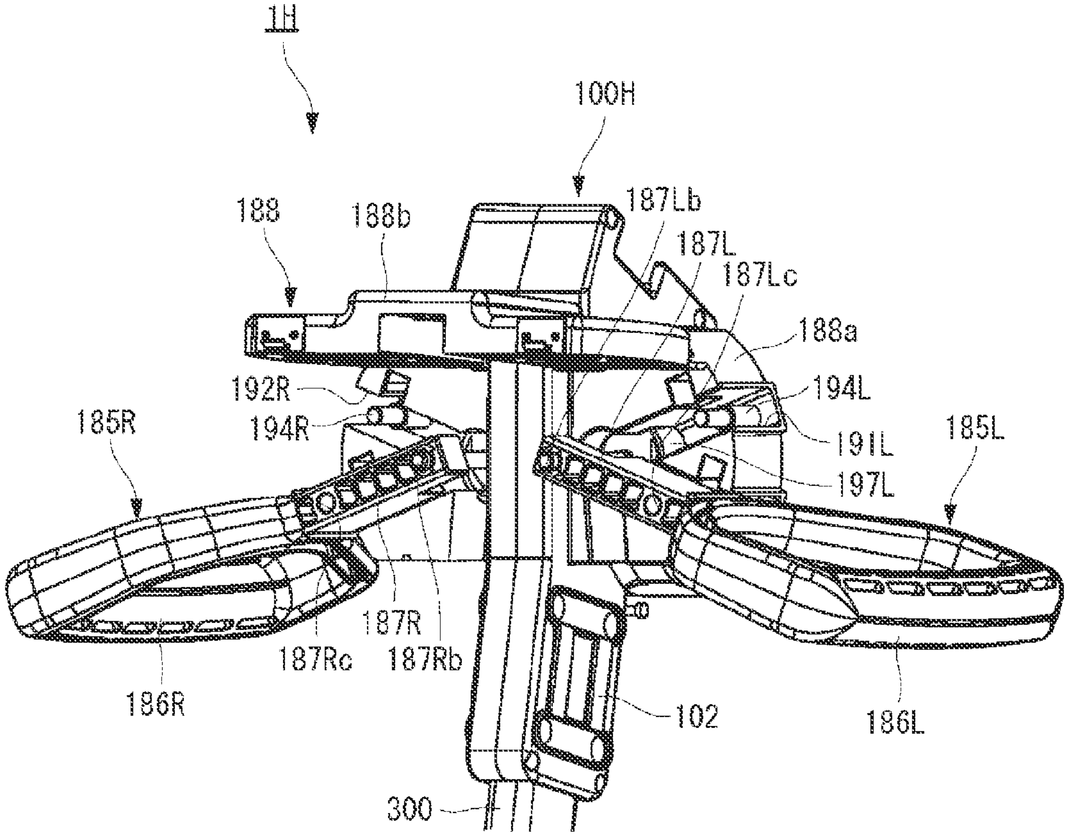
FIG. 27 is a perspective view of the first body part of the reinforcing bar binding machine of the eighth embodiment.

FIGS. 25, 26 and 27 are perspective views of a first body part 100H of a reinforcing bar binding machine 1H of an eighth embodiment.

A first body part 100H constituting the reinforcing bar binding machine 1H has a pair of handle parts 185R and 185L, a grip attaching part 188 for enabling positions of the handle parts 185R and 185L to be changed in the extension direction of the axis line A1 of the twisting shaft, and a first housing 102 configured to support an upper end-side of the elongated connecting part 300. Note that, since the handle parts 185R and 185L are bilaterally symmetric, the descriptions of one of the handle parts may be simplified or omitted.

The left handle part 185L has a grip 186L that is grasped by the user, and a grip connecting portion 187L connected to the grip 186L. The grip 186L is constituted by a closed ring-shaped body. One end portion of the grip connecting portion 187L is attached to the grip 186L, and a hole 187Lc for pin to which a first left guide pin 194L is mounted is formed in the vicinity of the attachment portion. A support shaft 187Lb is attached to the other end portion of the grip connecting portion 187L. The support shaft 187Lb is configured to be inserted and pulled out with respect to a hole 197L formed in a portion at which a first left groove 191L, a second left groove 192L and a third left groove 193L intersect.

Similarly, the right handle part 185R has a grip 186R that is grasped by the user, and a grip connecting portion 187R connected to the grip 186R. The grip 186R is constituted by a closed ring-shaped body. One end portion of the grip connecting portion 187R is attached to the grip 186R, and a hole 187Rc for pin to which a first right guide pin 194R is mounted is formed in the vicinity of the attachment portion. A support shaft 187Rb is attached to the other end portion of the grip connecting portion 187R. The support shaft 187Rb is configured to be inserted and pulled out with respect to a hole 197R formed in a portion at which a first left groove 191R, a second left groove 192R and a third left groove 193R intersect.

The grip attaching part 188 has a grip attaching member 188*a* and a cover 188*b*. The grip attaching member 188*a* is provided to the first housing 102, and has a plurality of grooves (which will be described later) for enabling attaching positions of the handle parts 185R and 185L to be varied. The cover 188*b* is attached so as to be rotatable about a support shaft provided to the grip attaching member 188*a*, and opens and closes a front surface-side of the grip attaching member 188*a*.

The front surface-side of the grip attaching member 188*a* is provided with the first right groove 191R, the first left groove 191L, the second right groove 192R, the second left groove 192L, the third right groove 193R and the third left groove 193L. The first right groove 191R, the second right groove 192R and the third right groove 193R and the first left groove 191L, the second left groove 192L and the third left groove 193L are bilaterally symmetric with respect to the extension direction of the axis line A1 of the twisting shaft, and radially extend from a substantial center of the grip attaching member 188*a*. The plurality of first right groove 191R and the like is each formed to have a substantially angled groove shape on a section to which the grip connecting portion 187R and the like can be fitted.

More specifically, the first right groove 191R extends obliquely right upward from the substantial center of the grip attaching member 188*a*, and the first left groove 191L extends obliquely left upward from the substantial center of the grip attaching member 188*a*. The second right groove 192R extends obliquely right downward from the substantial center of the grip attaching member 188*a*, and the second left groove 192L extends obliquely left downward from the substantial center of the grip attaching member 188*a*. The third right groove 193R extends downward from the substantial center of the grip attaching member 188*a*, and the third left groove 193L extends downward from the substantial center of the grip attaching member 188*a*.

A left outer end portion of the first left groove 191L is provided with a first left guide pin 194L that is inserted in the hole 187Lc for pin of the grip connecting portion 187L when fixing the grip height H of the handle part 185L. A left outer end portion of the second left groove 192L is provided with a second left guide pin 195L that is inserted in the 187Lc for pin of the grip connecting portion 187L when fixing the grip height H of the handle part 185L.

A right outer end portion of the first right groove 191R is provided with a first right guide pin 194R that is inserted in the hole 187Rc for pin of the grip connecting portion 187R when fixing the grip height H of the handle part 185R. A right outer end portion of the second right groove 192R is provided with a second right guide pin 195R that is inserted in the hole 187Rc for pin of the grip connecting portion 187R when fixing the grip height H of the handle part 185R.

Note that, in the eighth embodiment, similarly to the first embodiment, the grip heights H in states where the grip connecting portion 187R is fixed in each of the first right groove 191R, the second right groove 192R and the third right groove 193R are each referred to as the heights HR2, HR3 and HR4. In addition, the grip heights H in states where the grip connecting portion 187L is fixed in each of the first left groove 191L, the second left groove 192L and the third left groove 193L are each referred to as the height HL2, HL3 and HL4.

[Example of Operation of Reinforcing Bar Binding Machine 1H]

Subsequently, an example of the operation of the reinforcing bar binding machine 1H that is performed when changing the grip height H from the height HL2 to the height HL3 is described with reference to FIGS. 25 to 27.

As shown in FIG. 25, when the handle part 185L is located at the height HL2, the grip connecting portion 187R is fixed to the first right groove 191R, the grip connecting portion 187L is fixed to the first left groove 191L, and the grip height H is fixed to the height HL2.

First, the user releases the lock function of the grip attaching part 188, and opens the cover 188*b* with respect to the grip attaching member 188*a*, thereby exposing the front surface-side of the grip attaching member 188*a*. Note that, for the lock mechanism, a lock mechanism similar to FIG. 17 and the like can be adopted.

Then, as shown in FIGS. 25 and 26, the user grasps the grip 186L, pulls out the support shaft 187Lb of the grip connecting portion 187L from the hole 197L, and removes the first left guide pin 194L from the hole 187Lc for pin of the grip connecting portion 187L. Continuously, the user pulls out the grip connecting portion 187L from the first left groove 191L toward the front surface-side, and takes out the handle part 185L from the grip attaching member 188*a*.

Then, as shown in FIG. 27, the user positionally aligns the grip connecting portion 187L with the second left groove 192L, and inserts the support shaft 187Lb of the grip connecting portion 187L into the hole 197L and the second left guide the pin 195L into the hole 187Lc for pin of the grip connecting portion 187L.

Also for the right handle part 185R, the user performs a similar operation to the handle part 185L. Note that, the user may first perform the diverse operations for any of the right and left handle parts 185R and 185L.

Finally, the user closes the cover 188*b*, and locks the cover 188*b* to the grip attaching member 188*a*.

As described above, according to the eighth embodiment, similarly to the first embodiment, it is possible to change each of the left and right grip heights H in the extension direction of the axis line A1 of the twisting shaft, according to operation situations, and the height, difference in dominant hand and difference in taste of the operator. In addition, since the grips 186R and 186L are each constituted by the ring-shaped body, even when the reinforcing bar binding machine 1H is put on the reinforcing bars during the operation on the reinforcing bars, the grips 186R and 186L can be prevented from entering and being caught below the reinforcing bars. Thereby, the operation can be performed rapidly and efficiently.

The subject application is based on Japanese Patent Application Nos. 2018-168252 filed on Sep. 7, 2018 and 2019-156060 filed on Aug. 28, 2019, the contents of which are incorporated herein by reference.

REFERENCE SIGNS LIST

1A, 1B, 1C, 1D, 1E, 1F, 1G, 1H: reinforcing bar binding machine (binding machine)
100, 100B, 100C, 100E, 100F, 100G, 100H: first body part
102: first housing
120L, 120R, 151L, 151R, 163L, 163R, 175L, 175R, 186L, 186R: grip
121L, 121R: grip connecting portion
122L, 122R, 150L, 150R, 162L, 162R, 174L, 174R, 185L, 185R: handle part
123L1, 123R1: first grip portion
123L2, 123R2: second grip portion
124L, 124R: rotating grip connecting portion
125L, 125R: rotating handle part
126L, 126R: slide grip
127L, 127R: slide grip connecting portion
128L, 128R: slide handle part
130: grip attaching part
137: rotating grip attaching part
138: slide grip attaching part
140: battery mounting part
142: battery
160L, 160R: biaxial hinge
200: second body part
202: second housing
220: wire feeding unit
230A, 230B: curl guide
231A, 231B: first guide part
232A, 232B: second guide part
233: contact member
234: contact part
250: twisting unit
253: twisting shaft
300, 300C: connecting part
320: wiring bypass part
330: slide groove
A1: axis line of twisting shaft
A2: axis line of connecting part S: reinforcing bar (binding object)
W: wire
F: reinforcing bar arrangement surface
The invention claimed is:

1. A binding machine comprising:
a first body part;
a second body part including a wire feeder, a curl guide, a cutting unit, and a twisting unit, the wire feeder being configured to reel out and feed a wire from the wire reel on which the wire is wound, the curl guide having an opening in which a binding object can be inserted and being configured to curl the wire fed by the wire feeder around the binding object inserted in the opening, the cutting unit being configured to cut the wire curled by the curl guide, and the twisting unit including a twisting shaft for twisting the curled wire cut by the cutting unit; and
a connecting part connecting the first body part and the second body part, the connecting part being an elongated member,
wherein the first body part includes handle parts pairing up with each other and a grip attachment part,
wherein each of the handle parts includes a grip, to provide two grips, each being able to be grasped by an operator and a grip connecting portion connecting the each grip and the grip attachment part,
wherein each grip has a ring shape when viewed in an axis line direction of the connecting part, and
wherein viewed from a back side, corresponding to an operator side, the two grips are respectively positioned on both sides of the curl guide and, with respect to an axis of the opening of the curl guide, the two grips each having the ring shape are spaced from each other in a direction of the axis.

2. The binding machine according to claim 1,
wherein the handle parts are separated from each other and are connected to the grip attachment part individually.

3. The binding machine according to claim 2,
wherein the handle parts are connected to the grip attachment part such that a position of the grip of each of the handle parts is configured to be changed individually in an axis line direction of the twisting shaft.

4. The binding machine according to claim 3,
wherein the handle parts include a first handle part and a second handle part, and the grip connecting portion includes a first grip connecting part of the first handle part and a second grip connecting part of the second handle part,
wherein the grip attachment part includes a first attaching part and a second attaching part, the first attaching part including a first plurality of groove portions, and the second attaching part including a second plurality of groove portions,
wherein the first grip connecting part of the first handle part is configured to be inserted into any one of the first plurality of groove portions of the first attaching part, and
wherein the second grip connecting part of the second handle part is configured to be inserted into any one of the second plurality of groove portions of the second attaching part.

5. The binding machine according to claim 4,
wherein the first plurality of groove portions of the first attaching part extend radially, and
wherein the second plurality of groove portions of the second attaching part extend radially and are arranged bilaterally symmetric to the first plurality of groove portions of the first attaching part with respect to an extension direction of the axis line direction of the twisting shaft.

6. The binding machine according to claim 3,
wherein each of the handle parts is rotatably connected to the grip attachment part, and a position of the grip of each of the handle parts is able to be changed individually by rotation of each of the handle parts.

7. The binding machine according to claim 6,
wherein the handle parts include a first handle part and a second handle part,
wherein the grip connecting portion comprises a first grip connecting part of the first handle part and a second grip connecting part of the second handle part, the first grip connecting part comprising a first shaft and the second grip connecting part comprising a second shaft,
wherein the grip attachment part includes a first attaching part and a second attaching part, the first attaching part being provided with a first attachment hole in which the first shaft of the first handle part is inserted, and the second attaching part being provided with a second attachment hole in which the second shaft of the second handle part is inserted,
wherein the first attaching part is further provided with a first plurality of openings opened in an outer circumferential surface of the first attaching part around the first attachment hole, the first plurality of openings being arranged at intervals in a circumferential direction of the outer circumferential surface of the first attaching part,
wherein the second attaching part is further provided with a second plurality of openings opened in an outer circumferential surface of the second attaching part around the second attachment hole, the second plurality of openings being arranged at intervals in a circumferential direction of the outer circumferential surface of the second attaching part,
wherein the first handle part includes a first pin penetrating therethrough and configured to be inserted into any one of the first plurality of openings, and the second handle part includes a second pin penetrating therethrough and configured to be inserted into any one of the second plurality of openings.

8. The binding machine according to claim 1, wherein the elongated member includes a hollow rod-shaped member.

* * * * *